(12) United States Patent
Hsu

(10) Patent No.: US 11,509,175 B1
(45) Date of Patent: Nov. 22, 2022

(54) HOMOPOLAR MULTI-CORE ENERGY CONVERSION DEVICE

(71) Applicant: John Sheung-Chun Hsu, Oak Ridge, TN (US)

(72) Inventor: John Sheung-Chun Hsu, Oak Ridge, TN (US)

( * ) Notice: Subject to any disclaimer, the term of this patent is extended or adjusted under 35 U.S.C. 154(b) by 0 days.

(21) Appl. No.: 17/714,846

(22) Filed: Apr. 6, 2022

(51) Int. Cl.
*H02K 1/14* (2006.01)
*H02K 1/24* (2006.01)
*H02K 1/30* (2006.01)
*H02K 19/10* (2006.01)
*H02K 19/12* (2006.01)
*H02K 19/20* (2006.01)

(52) U.S. Cl.
CPC ............ *H02K 1/148* (2013.01); *H02K 1/246* (2013.01); *H02K 1/30* (2013.01); *H02K 19/103* (2013.01); *H02K 19/20* (2013.01); *H02K 19/12* (2013.01)

(58) Field of Classification Search
CPC .......... H02K 1/14; H02K 1/148; H02K 16/04; H02K 19/103; H02K 19/18; H02K 19/20; H02K 55/06; H02K 1/246; H02K 1/28; H02K 1/30
USPC .................................................. 310/177, 178
See application file for complete search history.

(56) References Cited

U.S. PATENT DOCUMENTS

| | | |
|---|---|---|
| 4,128,341 A | 12/1978 | Hsu |
| 4,542,323 A | 9/1985 | Doemen |

(Continued)

FOREIGN PATENT DOCUMENTS

| | | |
|---|---|---|
| CN | 102097914 | 6/2011 |
| CN | 103887908 A | 6/2014 |

(Continued)

OTHER PUBLICATIONS

Cheeshmehbeigi et al., ("Maximum Output Torque Control in Improved Flux Path Homopolar Brushless DC Motor With Axillary Field by Using Optimal Control of Turn-ON and Turn-OFF Angles in Variable Speed Applications," 2018,IEEE Journal of Emerging and Selected Topics in Power Electronics, vol. 6, No. 4 (Year: 2018).*

(Continued)

*Primary Examiner* — Eric Johnson

(57) ABSTRACT

A homopolar multi-core energy conversion device is an apparatus that uses magnetic flux commutation instead of a combination of electrical current commutation and brushes. The apparatus includes a first discontinuous annular stator core, a second discontinuous annular stator core, and a rotor core. The first discontinuous annular stator core is configured to generate a circumferentially-segmented clockwise magnetic flux around the rotor core, while second discontinuous annular stator core is configured to generate a circumferentially-segmented counter-clockwise magnetic flux around the rotor core. The rotor core is configured to radially partition a traversing magnetic flux. The circumferentially-segmented clockwise magnetic flux, the circumferentially-segmented counter-clockwise magnetic flux, and the traversing magnetic flux interact with each other so that the apparatus can function either as a motor or as a generator. The aforementioned components of the apparatus can be configured into different embodiment to achieve the same function.

17 Claims, 20 Drawing Sheets

(56) References Cited

U.S. PATENT DOCUMENTS

| | | |
|---|---|---|
| 5,019,766 A | 5/1991 | Hsu |
| 5,053,689 A | 10/1991 | Hsu |
| 5,116,215 A | 5/1992 | Hsu |
| 5,144,179 A | 9/1992 | Hilal |
| 5,178,458 A | 1/1993 | Hsu |
| 5,189,357 A | 2/1993 | Hsu |
| 5,285,144 A | 2/1994 | Hsu |
| 5,792,486 A | 8/1998 | Hsu |
| 5,844,345 A | 12/1998 | Hsu |
| 5,886,445 A | 3/1999 | Hsu |
| 5,900,260 A | 5/1999 | Hsu |
| 5,914,552 A | 6/1999 | Hsu |
| 5,929,579 A | 7/1999 | Hsu |
| 5,952,756 A | 9/1999 | Hsu |
| 6,057,622 A | 5/2000 | Hsu |
| 6,088,906 A | 7/2000 | Hsu |
| 6,161,517 A | 12/2000 | Sans |
| 6,191,517 B1 * | 2/2001 | Radovsky ............ H02K 21/24 310/216.061 |
| 6,310,417 B1 | 10/2001 | Hsu |
| 6,573,634 B2 | 6/2003 | Hsu |
| 6,700,297 B2 | 3/2004 | Hsu |
| 6,707,222 B2 | 3/2004 | Hsu |
| 6,831,442 B2 | 12/2004 | Hsu |
| 6,877,210 B2 | 4/2005 | Hsu |
| 6,891,301 B1 | 5/2005 | Hsu |
| 6,930,385 B2 | 8/2005 | Hsu |
| 6,972,504 B1 | 12/2005 | Hsu |
| 6,977,454 B2 | 12/2005 | Hsu |
| 6,989,619 B2 | 1/2006 | Hsu |
| 6,993,924 B2 | 2/2006 | Hsu |
| 7,023,171 B2 | 4/2006 | Su |
| 7,092,267 B2 | 8/2006 | Carlson |
| 7,129,611 B2 | 10/2006 | Hsu |
| 7,134,180 B2 | 11/2006 | Hsu |
| 7,191,605 B2 | 3/2007 | Hsu |
| 7,232,710 B2 | 6/2007 | Hsu |
| 7,266,969 B2 | 9/2007 | Hsu |
| 7,514,833 B2 | 4/2009 | Hsu |
| 7,518,278 B2 | 4/2009 | Hsu |
| 7,550,892 B2 | 6/2009 | Hsu |
| 7,560,847 B2 | 7/2009 | Hsu |
| 7,683,264 B2 | 3/2010 | Hsu |
| 7,695,663 B2 | 4/2010 | Hsu |
| 7,719,153 B2 | 5/2010 | Hsu |
| 7,936,076 B2 | 5/2011 | Hsu |
| 8,110,961 B2 | 2/2012 | Hsu |
| 8,143,834 B2 | 3/2012 | Hsu |
| 8,264,120 B2 | 9/2012 | Hsu |
| 8,294,321 B2 | 10/2012 | Hsu |
| 8,319,464 B2 | 11/2012 | Hsu |
| 8,330,319 B2 | 12/2012 | Hsu |
| 8,390,168 B2 | 3/2013 | Hsu |
| 8,760,105 B2 | 6/2014 | Hsu |
| 2002/0180303 A1 | 12/2002 | Hsu |
| 2003/0094880 A1 | 5/2003 | Hsu |
| 2004/0004410 A1 | 1/2004 | Hsu |
| 2004/0004852 A1 | 1/2004 | Hsu |
| 2004/0118144 A1 | 6/2004 | Hsu |
| 2004/0139596 A1 | 7/2004 | Hsu |
| 2004/0164432 A1 | 8/2004 | Hsu |
| 2004/0232592 A1 | 11/2004 | Hsu |
| 2004/0232794 A1 | 11/2004 | Hsu |
| 2007/0152533 A1 | 7/2007 | Hsu |
| 2008/0066957 A1 | 3/2008 | Hsu |
| 2008/0173486 A1 | 7/2008 | Hsu |
| 2009/0146511 A1 | 6/2009 | Hsu |
| 2009/0218895 A1 | 9/2009 | Hsu |
| 2009/0236924 A1 | 9/2009 | Hsu |
| 2010/0123364 A1 | 5/2010 | Hsu |
| 2011/0043154 A1 | 2/2011 | Hsu |
| 2011/0204741 A1 | 8/2011 | Hsu |
| 2011/0234139 A1 | 9/2011 | Hsu |
| 2012/0126655 A1 | 5/2012 | Hsu |
| 2012/0133320 A1 | 5/2012 | Hsu |

FOREIGN PATENT DOCUMENTS

| | | | | |
|---|---|---|---|---|
| CN | 109471456 A | | 3/2019 | |
| CN | 109474156 A | * | 3/2019 | ............ H02K 1/14 |
| CN | 109474156 A | | 3/2019 | |
| FR | 2602378 A1 | * | 2/1988 | |
| FR | 2602378 A1 | | 2/1988 | |
| FR | 2603433 A | * | 3/1988 | ............ H02K 19/20 |
| KR | 20110118193 A | * | 10/2011 | |
| KR | 20110118193 A | | 10/2011 | |
| WO | WO2013114286 A2 | | 8/2013 | |

OTHER PUBLICATIONS

Cheeshmehbeigi et al., Maximum Output Torque Control in Improved Flux Path Homo polar Brushiess DC Motor With Axillary Field by Using Optimal Control of Turn-Off Angles in Variable Speed Applications, IEEE Journal of Emerging and Selected Topics in Power Electronics, Dec. 4, 2018, pp. 1722-1731, vol. 6, No. 4, IEEE, New York, United States doi: 10.1109/JESTPE.2018.2850349.

* cited by examiner

US 11,509,175 B1

HOMOPOLAR MULTI-CORE ENERGY CONVERSION DEVICE

FIELD OF THE INVENTION

The present invention generally relates to a motor/generator used in electric vehicles. More specifically, the present invention is a homopolar separation bidirectional electrical-energy/kinetic-energy converter.

BACKGROUND OF THE INVENTION

A battery for an electric vehicle is a direct-current (DC) energy storage device. In order to use a battery to run a motor, there are two existing options: one option is to use an older-style electric current commutator with brushes motor; and the other option is to use a power-electronic inverter to change the DC power to a multi-phase alternating-current (AC) power and then use this multi-phase alternating-current (AC) electrical power to run an induction motor or a synchronous motor that has a rotor with field-excitation coil, slip-rings, and brushes or has a permanent-magnet rotor without slip-rings. The current technology for battery-powered motors relies heavily on getting rid of the brushes and using an external power-electronic inverter.

The present invention is different from either using the older changing DC current path commutation or the newer power-electronic inverter approaches. The present invention addresses a brushless magnetic-flux commutation (not the electric DC current commutation) in order to improve the performance of DC-current motor drive systems at a lower cost. The present invention also opens up new efficiency improvement opportunities. For example, when a vehicle is going downhill, the fixed excitation flux disables the control of the back-emf that may be used directly to slow down the vehicle and to recharge the battery for energy recovery, while the current technology uses a rotor with the expensive high-strength rare-earth permanent magnets without brushes. Because the excitation field is fixed by the permanent magnets, it is impossible to directly improve its performance by adjusting the excitation field. Thus, the present invention as a proposed homopolar separation unification (HSU) DC motor/generator with a novel approach for magnetic flux commutation can further increase the reliability and efficiency of a drive system due to its simpler arrangement of components and can reduce both air pollution and system cost.

During development of the present invention, in order to realize the full potential of the "Homopolar-Separation" concept, a new approach to include the "Unification" with two opposite bi-polar stator cores, one core for each homopolar rotor was created. Additionally, the rotor with magnetic flux barriers was developed. Thus, the present invention was created as an HSU permanent-magnet-less, adjustable-excitation-field, brushless, current-commutator-less, DC motor/generator with natural-magnetic-flux commutation. An objective of the present invention is to provide a natural brush-less magnetic-flux commutation feature, which cannot be provided by any other types of battery-fed motors/generators.

SUMMARY OF THE INVENTION

An objective of the present invention is to provide a motor/generator that uses magnetic flux commutation instead of a combination of electrical current commutation and brushes. Another objective of the present invention is to provide a motor/generator that does not use a power electronic inverter to convert DC from a battery into alternating current (AC) for motor drive. Another objective of the present invention is to provide a motor/generator that uses excitation coils instead of expensive permanent magnets in order to produce a stationary field with a wide range of excitation fluxes. Another objective is to provide a motor/generator that has energy recovery for the battery of a vehicle during deceleration when the vehicle wheels (or the shaft of the motor/generator) are still turning in a forward direction while still needing some opposite torque from the motor/generator to counter the forward kinetic energy of the vehicle before the vehicle comes to a complete stop at a stop sign, a stop light, or some other stopping situation. This opposite torque is generated by increasing the relatively small field excitation current to increase the field flux, resulting in the back emf becoming higher than the original battery terminal voltage, thus reversing the battery current and recharging the battery. This back emf braking before the final friction braking can also reduce global warming by reducing the usage time of the conventional friction braking. The present invention also works during down-hill drive, when the vehicle wheels are turning forward but yet need some opposite torque to counter the vehicle down-hill weight energy. Another objective is to provide a rotor core that has better rotor flux carrying capability without the excitation field coil or permanent magnets packed inside the rotor.

DETAILED DESCRIPTION OF THE INVENTION

All illustrations of the drawings are for the purpose of describing selected versions of the present invention and are not intended to limit the scope of the present invention.

Figure 1:
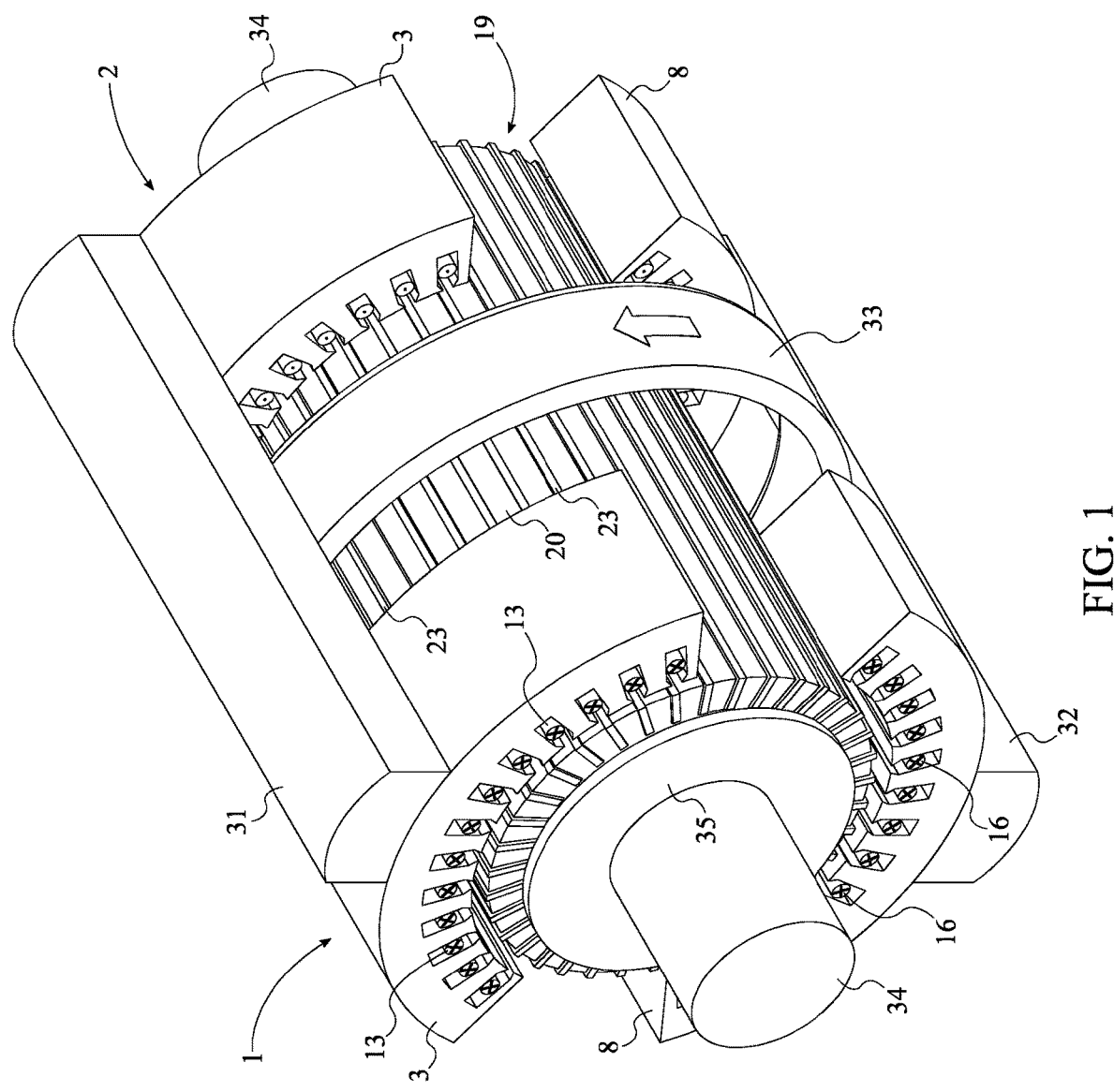
FIG. 1 is a front-left-top perspective view of the present invention.
Figure 2:
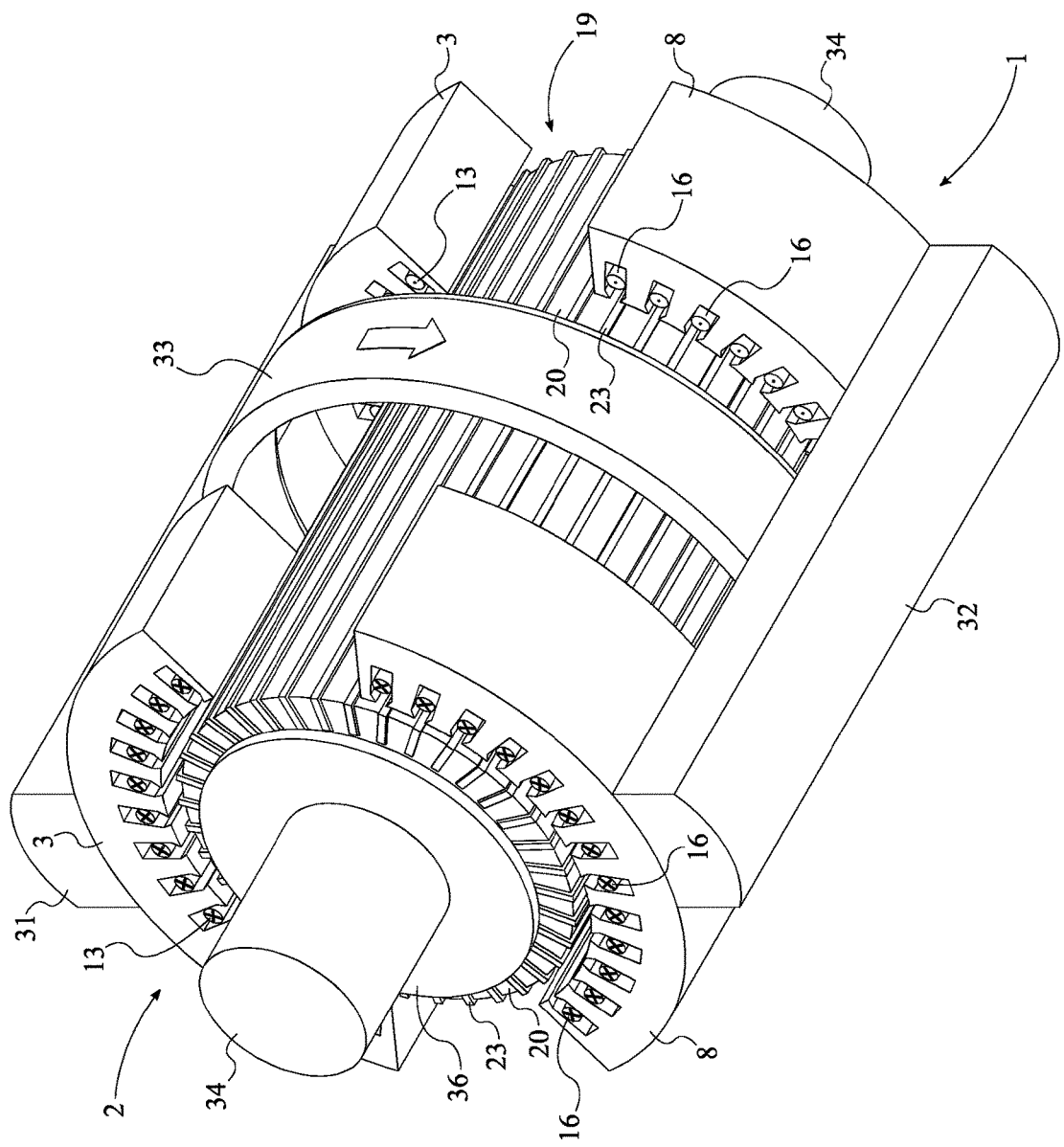
FIG. 2 is a rear-right-bottom perspective view of the present invention.

The present invention is a homopolar multi-core energy conversion device that does not use a permanent magnet, a brush, a slip ring, or combinations thereof in order to convert electrical energy into rotational kinetic energy and vice versa. As can be seen in in FIGS. 1 and 2, the present invention comprises a first discontinuous annular stator core 1, a second discontinuous annular stator core 2, and a rotor core 19. The first discontinuous annular stator core 1 and the second discontinuous annular stator core 2 are used to form a stator of the present invention and prevents the short circuiting of a magnetic flux traveling through their discontinuous annular shape. The rotor core 19 is an elongated cylindrically-shaped component that forms a rotor of the present invention and allows either electrical energy powering the present invention to be outputted as kinetic rotational energy or kinetic rotational energy received from an external source to be converted into electrical energy. In addition, the present invention may further comprise a housing that is made of an electrically insulative material and is used to enclose and prevent damage to the other components of the present invention.

The general configuration of the aforementioned components allows the present invention to effectively and efficiently convert electrical energy into rotational kinetic energy and vice versa. As can be seen in FIGS. 1 through 4, the rotor core 19 is rotatably mounted within the first discontinuous annular stator core 1 and the second discontinuous annular stator core 2, which allows the present invention to output or receive rotational kinetic energy. The first discontinuous annular stator core 1 and the second discontinuous annular stator core 2 are positioned opposite to each other along the rotor core 19 so that a set of magnetic polarities generated by the first discontinuous annular stator core 1 and a set of opposite magnetic polarities generated by the second discontinuous annular stator core 2 are able to drive the rotation of the rotor core 19. Alternatively, rotating the rotor core 19 is able to generate a set of magnetic polarities in the first discontinuous annular stator core 1 and a set of opposite magnetic polarities in the second discontinuous annular stator core 2. As can be seen in FIGS. 5 through 12, the first discontinuous annular stator core 1 is positioned offset from the rotor core 19 by a first annular gap 26 in order to prevent any friction between the first discontinuous annular stator core 1 and the rotor core 19. Similarly, the second discontinuous annular stator core 2 is positioned offset from the rotor core 19 by a second annular gap 27 in order to prevent any friction between the second discontinuous annular stator core 2 and the rotor core 19.

In order for the present invention to convert one kind of energy into another kind of energy, the first discontinuous annular stator core 1 is configured to generate a circumferentially-segmented clockwise magnetic flux 28 around the rotor core 19, and the circumferentially-segmented clockwise magnetic flux 28 is generated by electrical wirings that are threaded through the first discontinuous annular stator core 1, which is shown in FIGS. 5 through 8. Likewise, the second discontinuous annular stator core 2 is configured to generate a circumferentially-segmented counter-clockwise magnetic flux 29 around the rotor core 19, and the circumferentially-segmented counter-clockwise magnetic flux 29 is generated by electrical wirings that are threaded through the second discontinuous annular stator core 2, which is shown in FIGS. 9 through 12. The rotor core 19 is also configured to radially partition a traversing magnetic flux 30, which is oriented along the rotor core 19. The interaction between the circumferentially-segmented clockwise magnetic flux 28, the circumferentially-segmented counter-clockwise magnetic flux 29, and the traversing magnetic flux 30 either allows an input of electrical energy into the present invention to rotate the rotor core 19 or allows an input of kinetic rotational energy through the rotor core 19 to generate electrical energy with the present invention.

As can be seen in FIGS. 1 through 12, the present invention needs to prevent the circumferentially-segmented clockwise magnetic flux 28 from short circuiting through the first discontinuous annular stator core 1 and needs to prevent the circumferentially-segmented counter-clockwise magnetic flux 29 from short circuiting through the second discontinuous annular stator core 2. Thus, the first discontinuous annular stator core 1 and the second discontinuous annular stator core 2 each comprise an upper arc-shaped core portion 3 and a lower arc-shaped core portion 8, which are two halves of an annular stator core and are electrically insulated from each other. The upper arc-shaped core portion 3 and the lower arc-shaped core portion 8 are preferably made of iron but can be made of other kinds of conductive material. The upper arc-shaped core portion 3 and the lower arc-shaped core portion 8 are also positioned offset from each other about the rotor core 19 so that a magnetic flux travelling around an annular stator core can be circumferentially partitioned around the annular stator core. In addition, the upper arc-shaped core portion 3 comprises an upper magnetically-north arc end 4 and an upper magnetically-south arc end 5, while the lower arc-shaped core portion 8 comprises a lower magnetically-north arc end 9 and a lower magnetically-south arc end 10. These magnetically-polarized ends of the upper arc-shaped core portion 3 and the lower arc-shaped core portion 8 are the electromagnetic result of the circumferentially-segmented clockwise magnetic flux 28 travelling through the first discontinuous annular stator core 1 and the electromagnetic result of the circumferentially-segmented counter-clockwise magnetic flux 29 travelling through the second discontinuous annular stator core 2. Moreover, the upper magnetically-north arc end 4 and the lower magnetically-south arc end 10 are positioned adjacent to each other, while the upper magnetically-south arc end 5 and the lower magnetically-north arc end 9 are positioned adjacent to each other. This arrangement either allows an input of electrical energy into the present invention to generate a magnetic flux that is oriented to drive the rotation of the rotor core 19 or allows an input of kinetic rotational energy through the rotor core 19 to generate a magnetic flux that is oriented to generate electrical energy with the present invention.

An arrangement of the magnetically-polarized ends for the upper arc-shaped core portion 3 between the first discontinuous annular stator core 1 and the second discontinuous annular stator core 2 allows the traversing magnetic flux 30 to functionally interact with the circumferentially-segmented clockwise magnetic flux 28 and the circumferentially-segmented counter-clockwise magnetic flux 29, which is shown in FIGS. 3 through 5, 7, 9, and 11. Thus, the upper magnetically-north arc end 4 of the first discontinuous annular stator core 1 and the upper magnetically-south arc end 5 of the second discontinuous annular stator core 2 are positioned coincident with each other along the rotor core 19. As a result, the upper magnetically-north arc end 4 of the first discontinuous annular stator core 1 is able to repel a north pole of the traversing magnetic flux 30, and the upper magnetically-south arc end 5 of the second discontinuous annular stator core 2 is able to repel a south pole of the traversing magnetic flux 30, both of which apply a torque on the rotor core 19 in the same direction. In addition, the upper magnetically-south arc end 5 of the first discontinuous annular stator core 1 and the upper magnetically-north arc end 4 of the second discontinuous annular stator core 2 are positioned coincident with each other along the rotor core 19. As a result, the upper magnetically-south arc end 5 of the first discontinuous annular stator core 1 is able to attract the north pole of the traversing magnetic flux 30, and the upper magnetically-north arc end 4 of the second discontinuous annular stator core 2 is able to attract the south pole of the traversing magnetic flux 30, both of which applies a torque on the rotor core 19 in the same direction.

A similar arrangement of the magnetically-polarized ends for the lower arc-shaped core portion 8 between the first discontinuous annular stator core 1 and the second discontinuous annular stator core 2 allows the traversing magnetic flux 30 to functionally interact with the circumferentially-segmented clockwise magnetic flux 28 and the circumferentially-segmented counter-clockwise magnetic flux 29, which is also shown in FIGS. 3 through 5, 7, 9, and 11. Thus, the lower magnetically-south arc end 10 of the first discontinuous annular stator core 1 and the lower magnetically-north arc end 9 of the second discontinuous annular stator core 2 are positioned coincident with each other along the rotor core 19. As a result, the lower magnetically-south arc end 10 of the first discontinuous annular stator core 1 is able to attract the north pole of the traversing magnetic flux 30, and the lower magnetically-north arc end 9 of the second discontinuous annular stator core 2 is able to attract the south pole of the traversing magnetic flux 30, both of which apply a torque on the rotor core 19 in the same direction. In addition, the lower magnetically-north arc end 9 of the first discontinuous annular stator core 1 and the lower magnetically-south arc end 10 of the second discontinuous annular stator core 2 are positioned coincident with each other along the rotor core 19. As a result, the lower magnetically-north arc end 9 of the first discontinuous annular stator core 1 is able to repel the north pole of the traversing magnetic flux 30, and the lower magnetically-south arc end 10 of the second discontinuous annular stator core 2 is able to repel the south pole of the traversing magnetic flux 30, both of which applies a torque on the rotor core 19 in the same direction.

Figure 3:
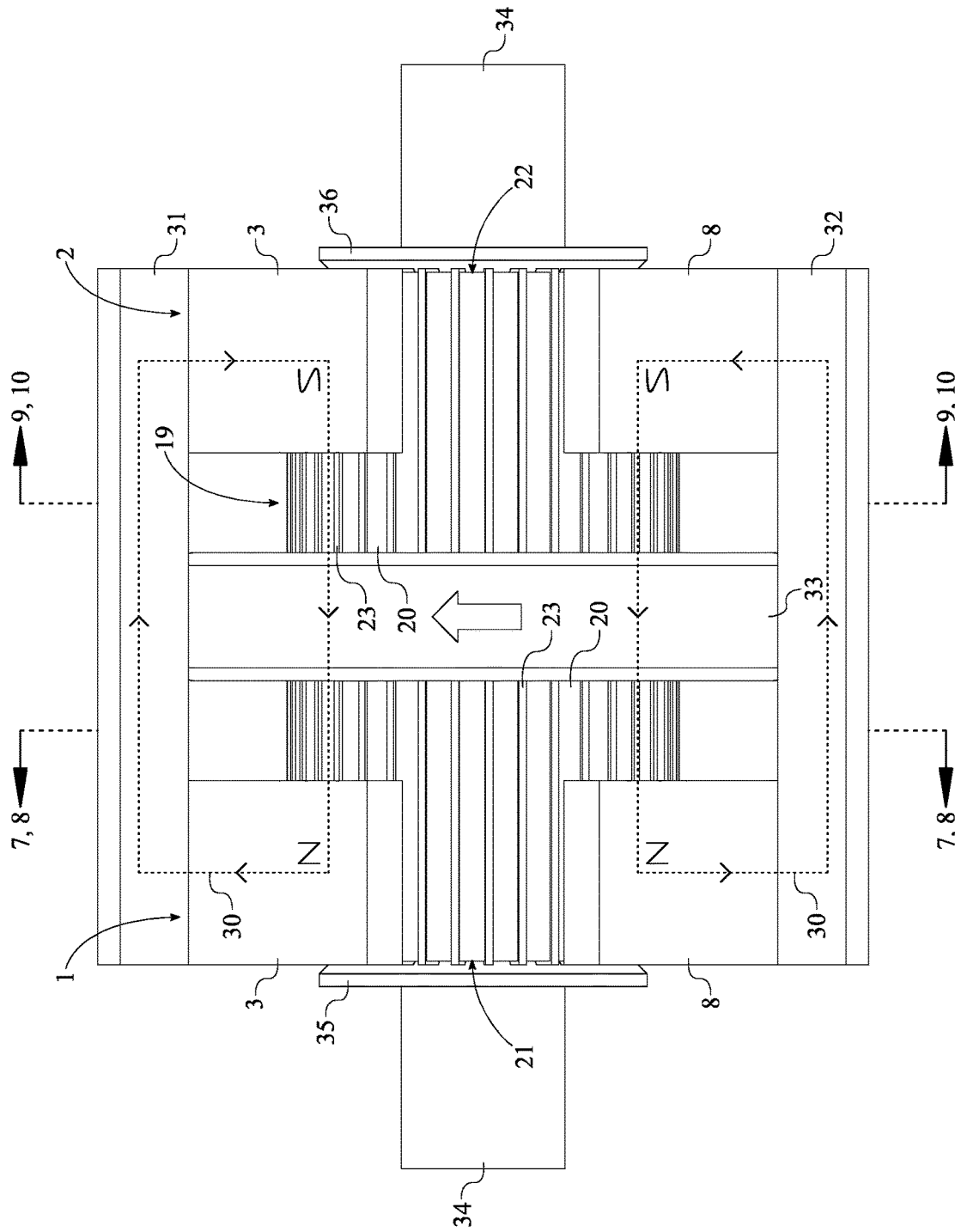
FIG. 3 is a left-side view of the present invention.
Figure 4:
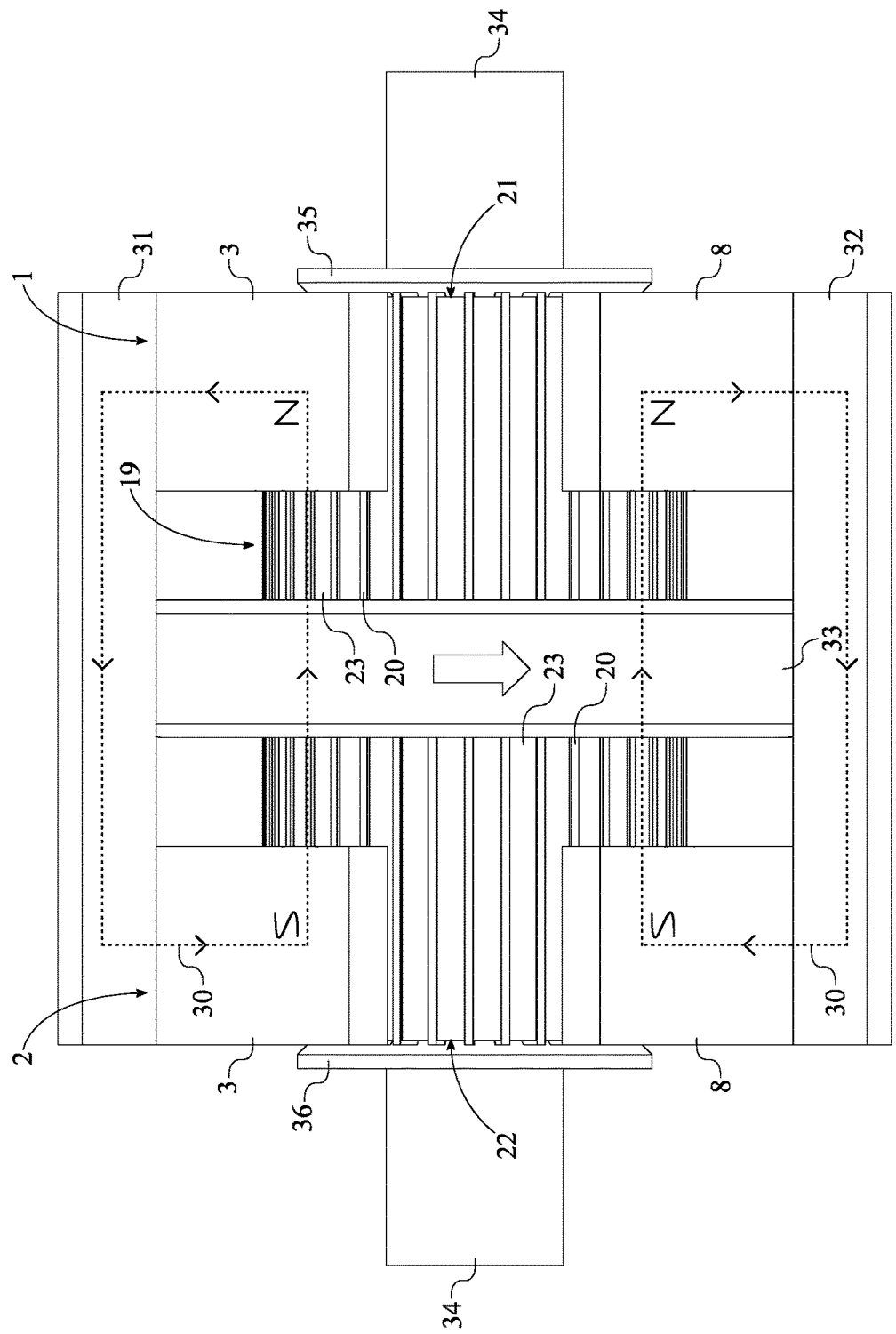
FIG. 4 is a right-side view of the present invention.
Figure 5:
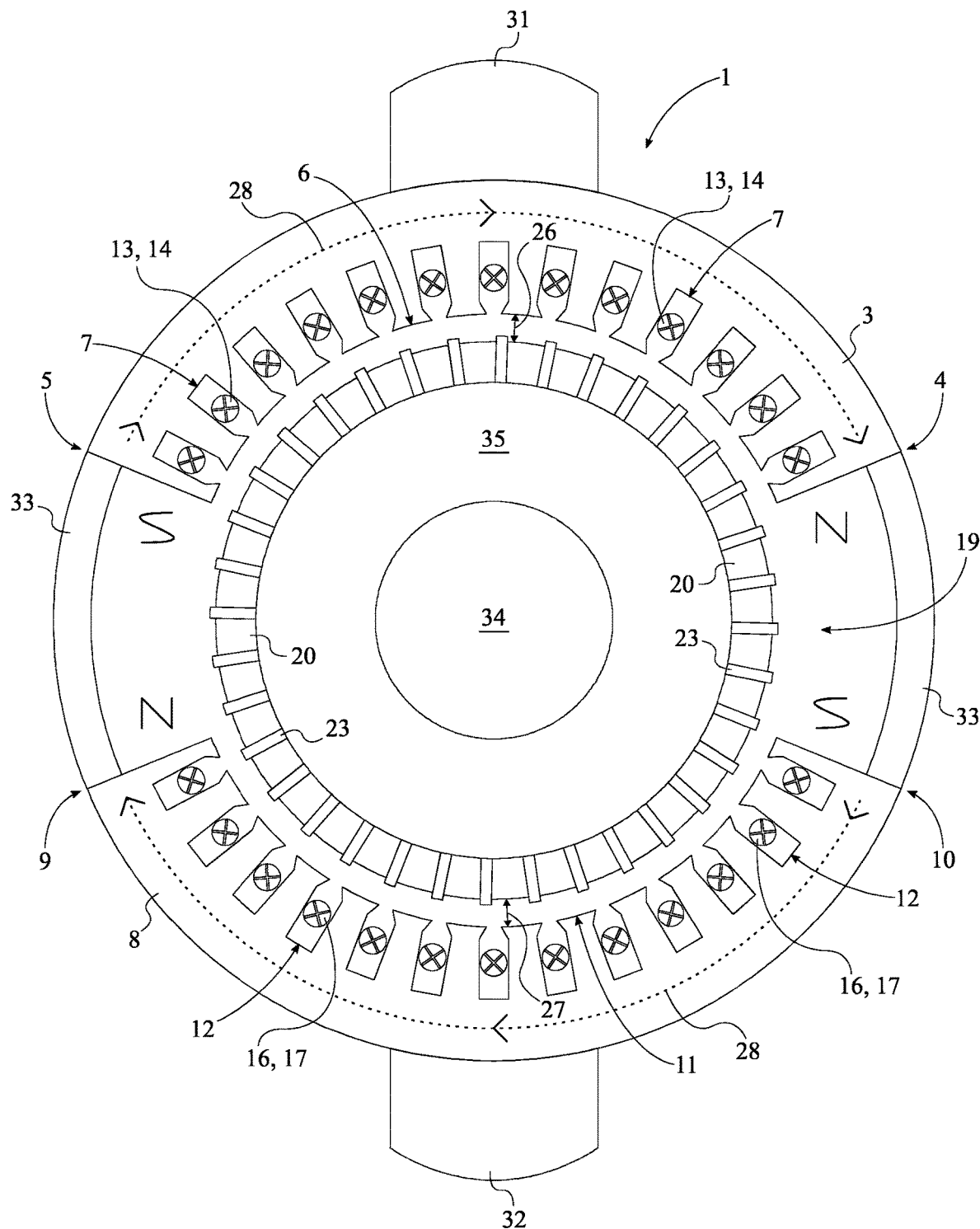
FIG. 5 is a front view of the present invention showing the magnetic flux generated by the first discontinuous annular stator core.
Figure 6:
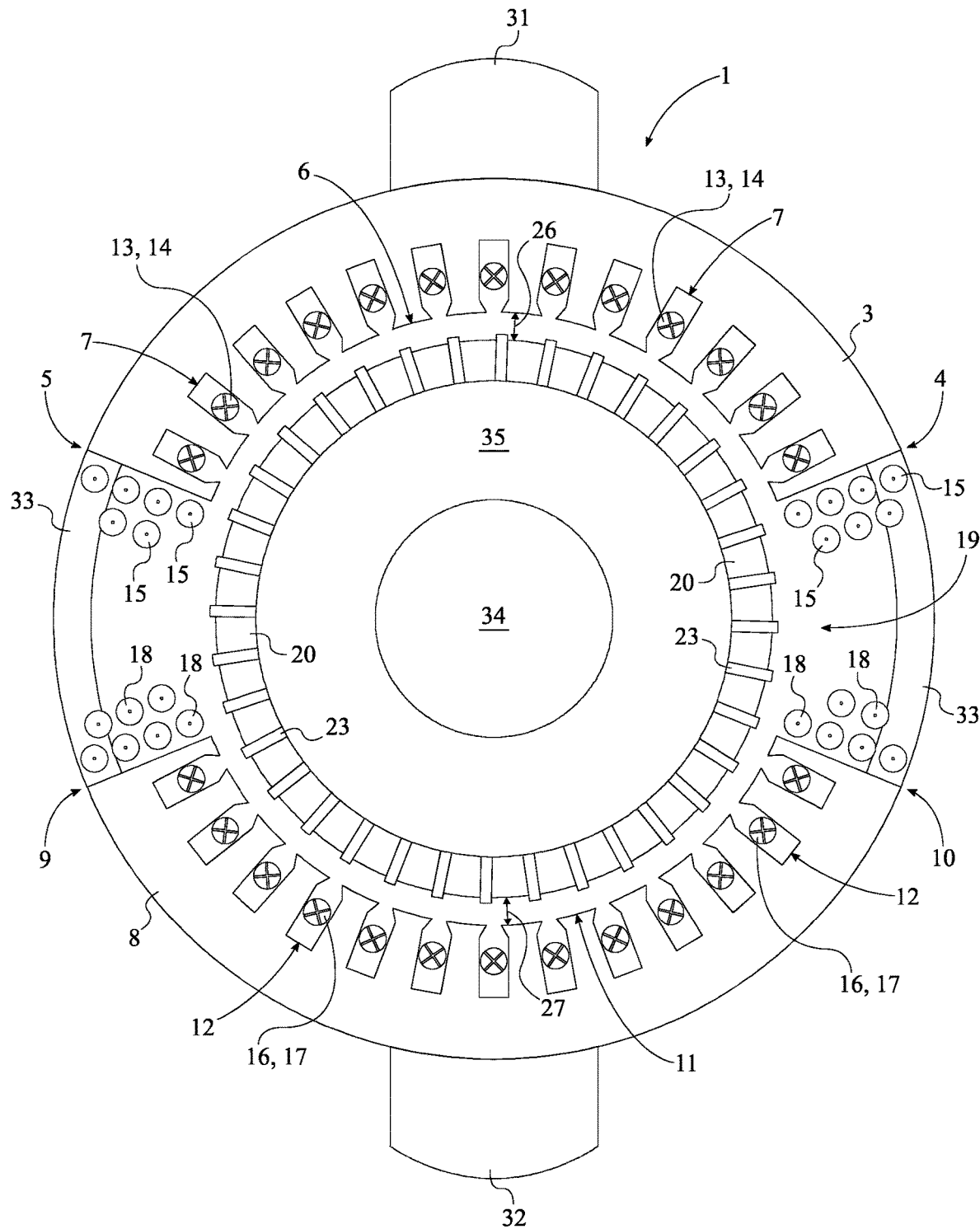
FIG. 6 is a front view of the present invention showing the entire wiring wound through the first discontinuous annular stator core.
Figure 7:
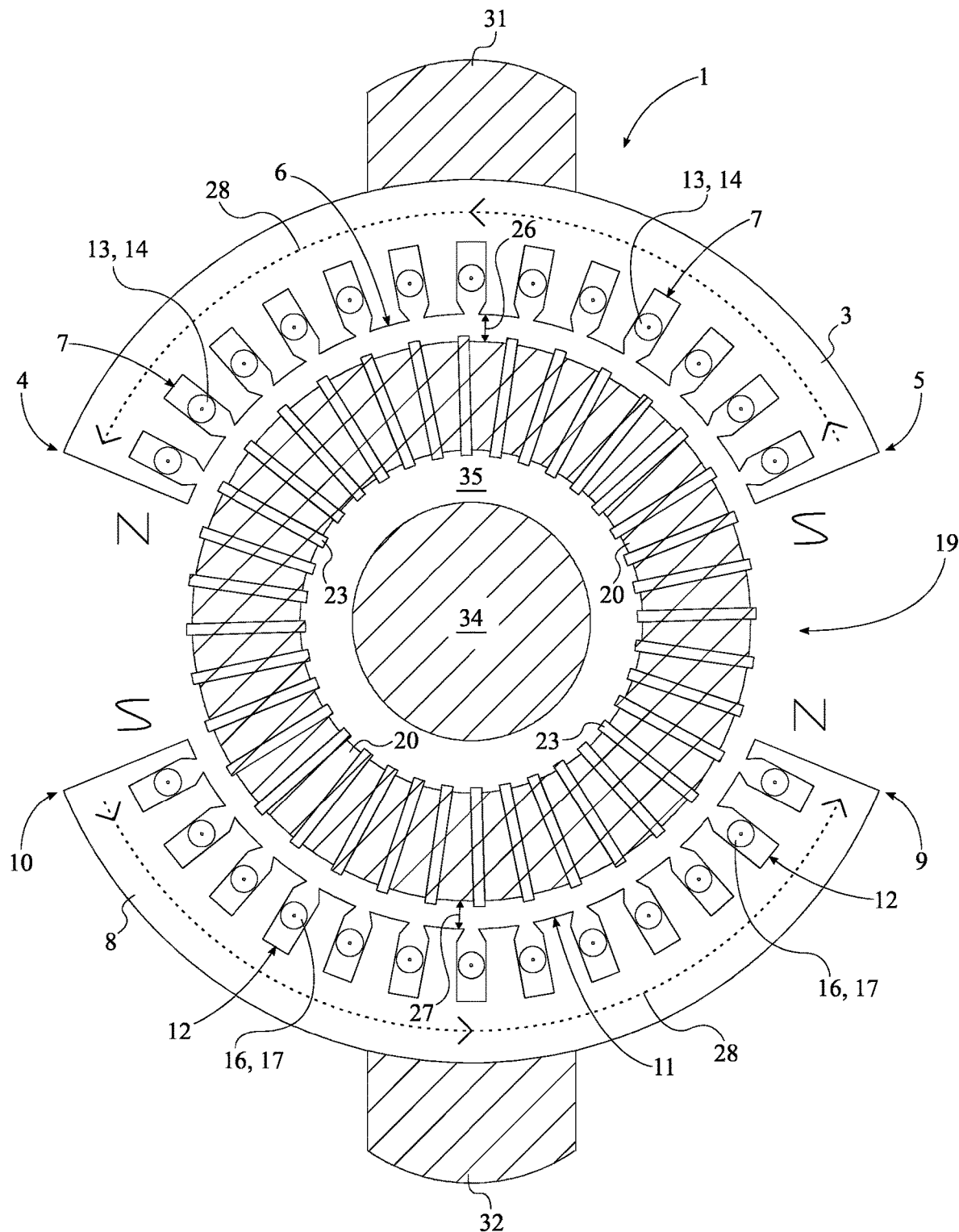
FIG. 7 is a cross-sectional view taken along line A-A in FIG. 3 showing the magnetic flux generated by the first discontinuous annular stator core.
Figure 8:
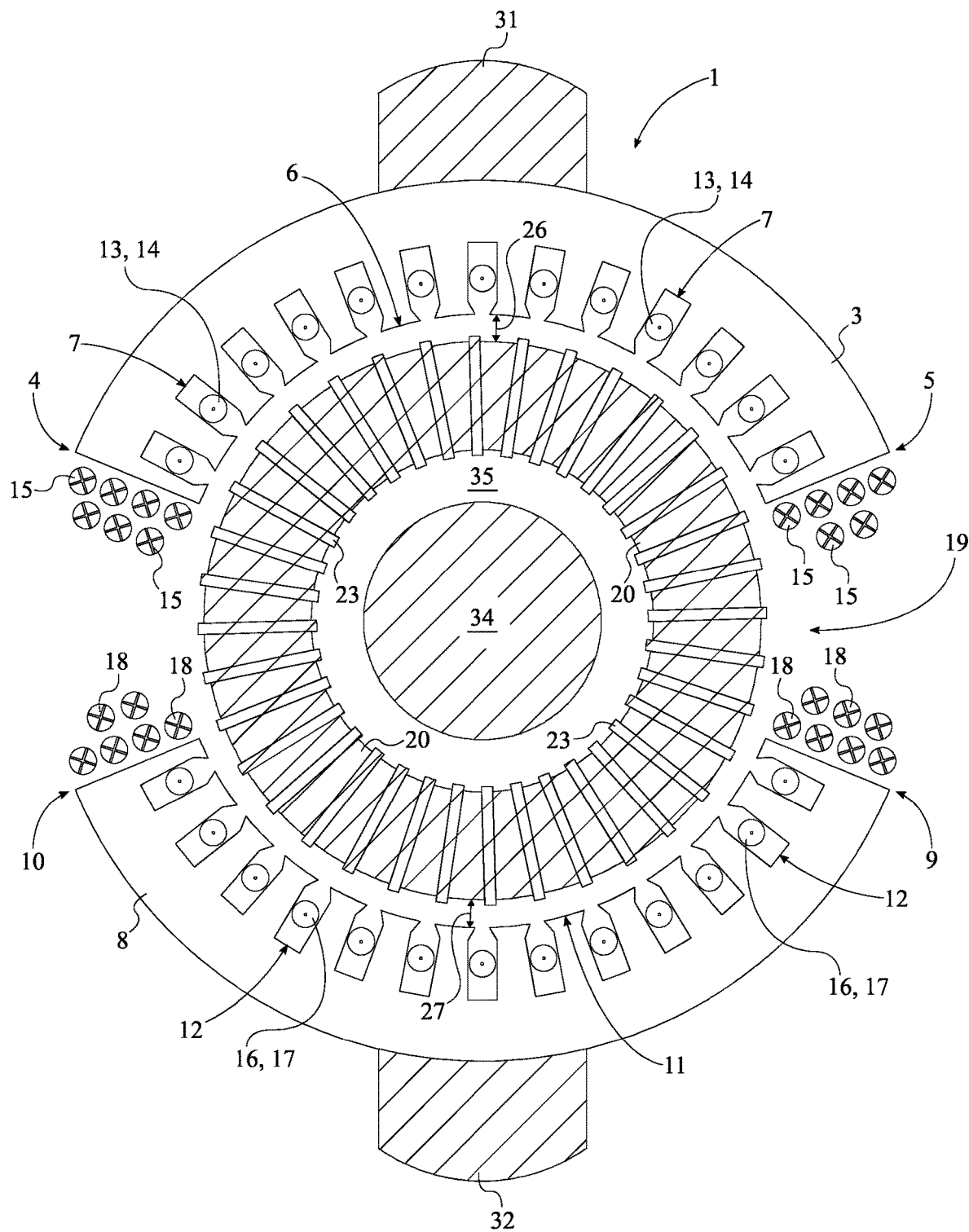
FIG. 8 is a cross-sectional view taken along line A-A in FIG. 3 showing the entire wiring wound through the first discontinuous annular stator core.
Figure 9:
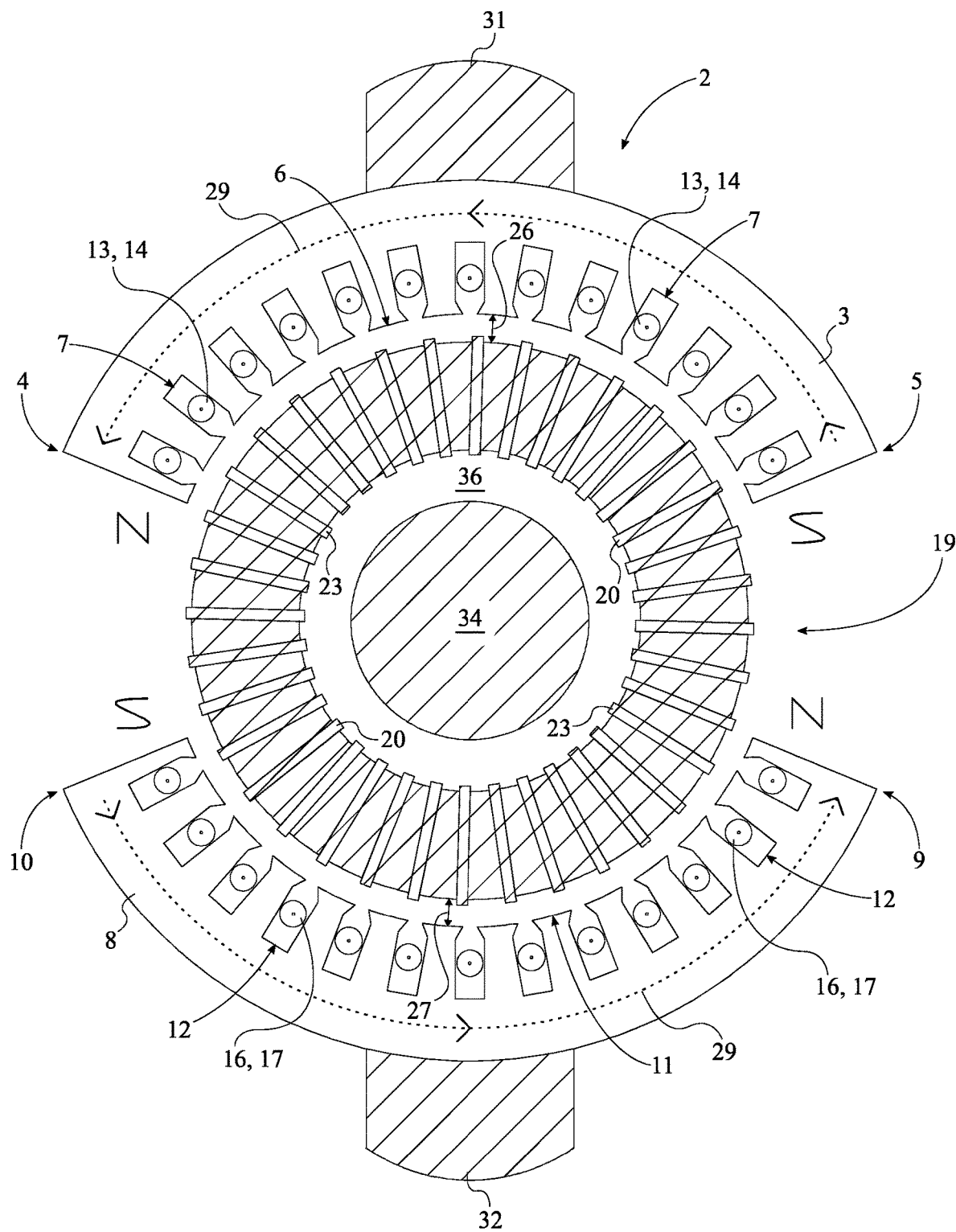
FIG. 9 is a cross-sectional view taken along line B-B in FIG. 3 showing the magnetic flux generated by the second discontinuous annular stator core.
Figure 10:
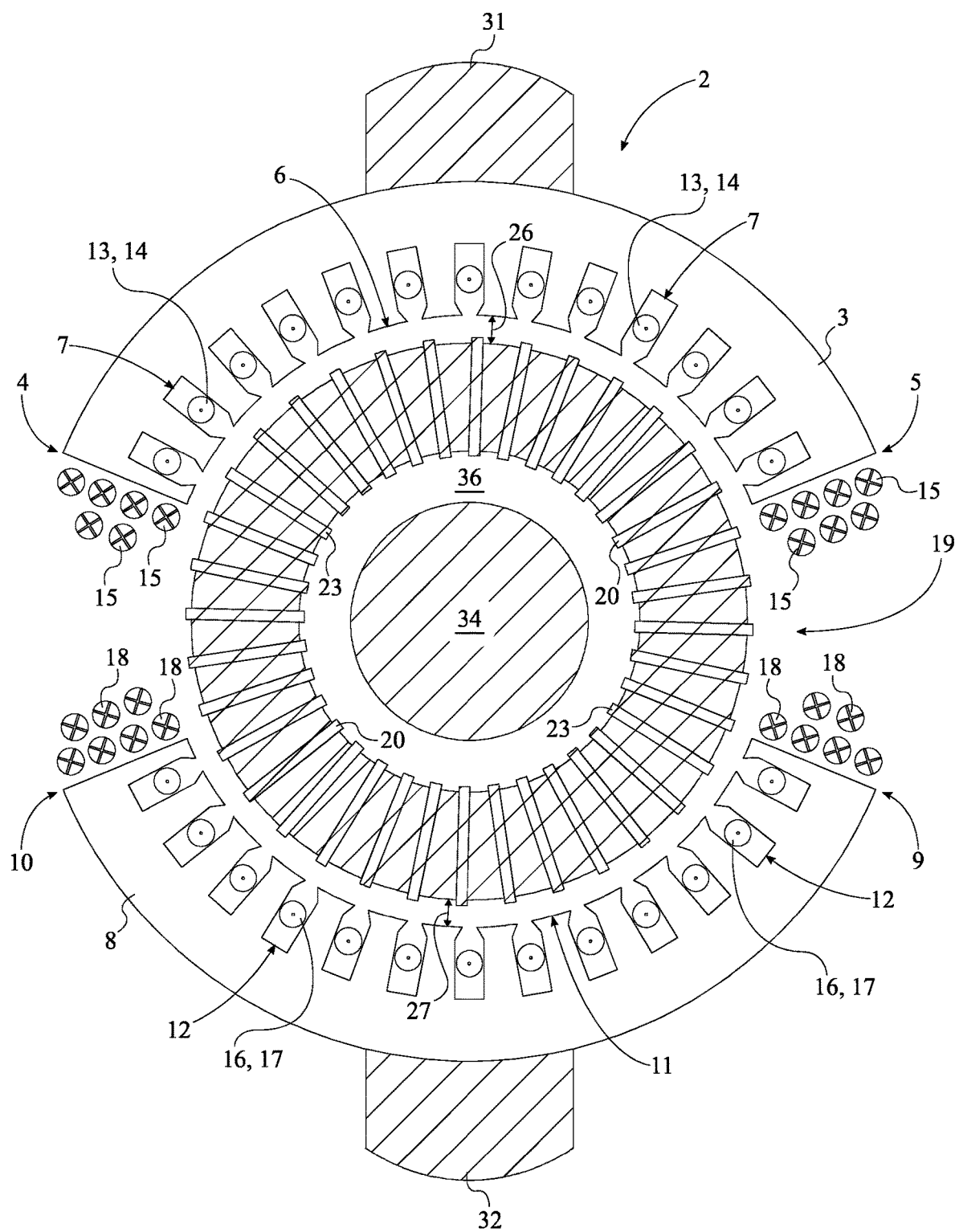
FIG. 10 is a cross-sectional view taken along line B-B in FIG. 3 showing the entire wiring wound through the second discontinuous annular stator core.
Figure 11:
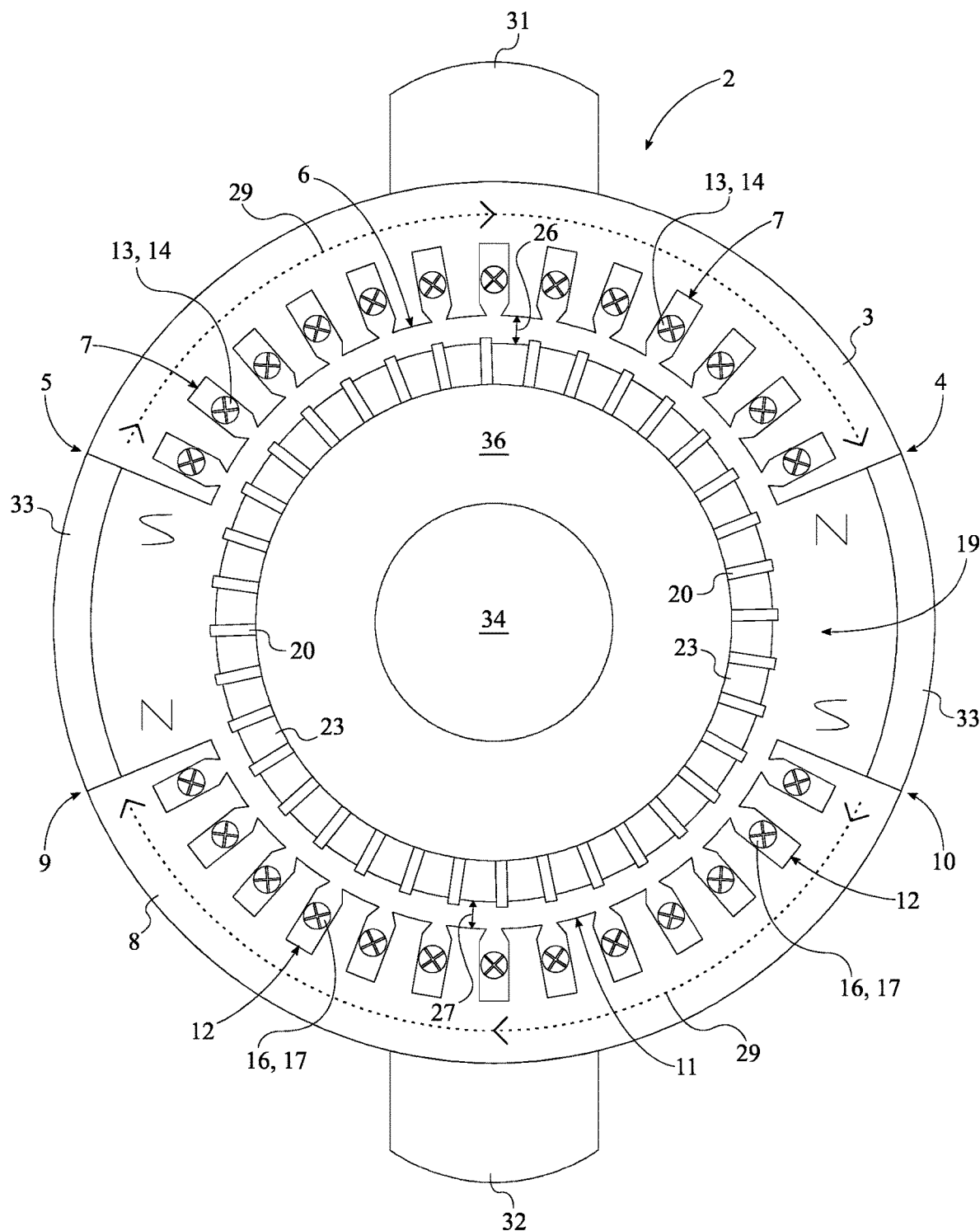
FIG. 11 is a rear view of the present invention showing the magnetic flux generated by the second discontinuous annular stator core.
Figure 12:
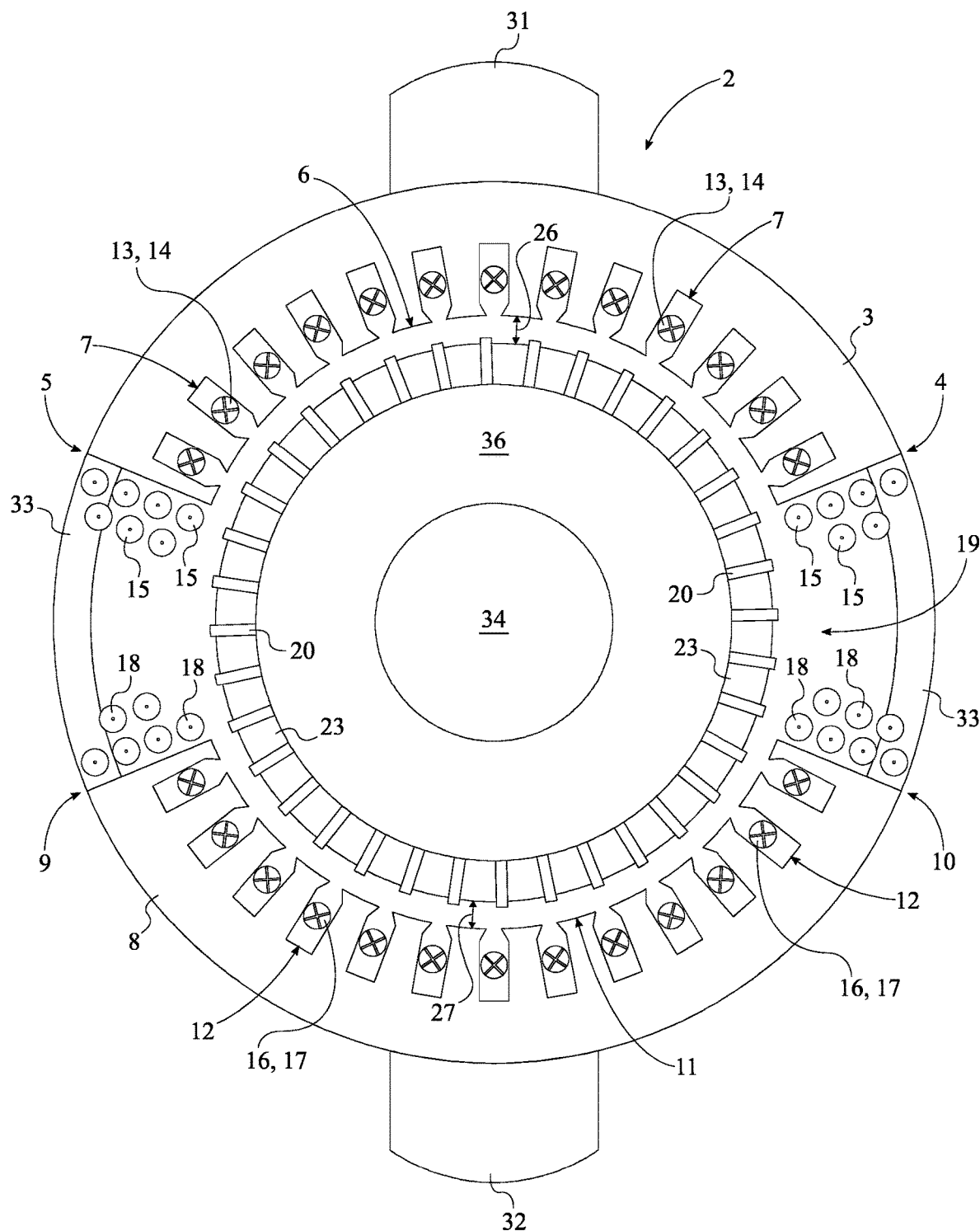
FIG. 12 is a rear view of the present invention showing the entire wiring wound through the second discontinuous annular stator core.

As can be seen in FIGS. 3 and 4, the traversing magnetic flux 30 is partitioned in one instance as the traversing magnetic flux 30 travels from the upper arc-shaped core portion 3 of the second discontinuous annular stator core 2, through the rotor core 19, and to the upper arc-shaped core portion 3 of the first discontinuous annular stator core 1. Thus, the present invention may further comprise an upper magnetic-flux conductor 31 in order for the traversing magnetic flux 30 to travel from the upper arc-shaped core portion 3 of the first discontinuous annular stator core 1 back to the upper arc-shaped core portion 3 of the second discontinuous annular stator core 2. The upper magnetic-flux conductor 31 is laterally positioned to the first discontinuous annular stator core 1 and the second discontinuous annular stator core 2 so that the upper magnetic-flux conductor 31 does not mechanically interfere with the rotation of the rotor core 19. In addition, the upper magnetic-flux conductor 31 is connected in between the upper arc-shaped core portion 3 of the first discontinuous annular stator core 1 and the upper arc-shaped core portion 3 of the second discontinuous annular stator core 2, which provides the physical conductive path for the traversing magnetic flux 30 to travel from the upper arc-shaped core portion 3 of the first discontinuous annular stator core 1 back to the upper arc-shaped core portion 3 of the second discontinuous annular stator core 2.

As can be seen in FIGS. 3 and 4, the traversing magnetic flux 30 is partitioned in another instance as the traversing magnetic flux 30 travels from the lower arc-shaped core portion 8 of the second discontinuous annular stator core 2, through the rotor core 19, and to the lower arc-shaped core portion 8 of the first discontinuous annular stator core 1. Thus, the present invention may further comprise a lower magnetic-flux conductor 32 in order for the traversing magnetic flux 30 to travel from the lower arc-shaped core portion 8 of the first discontinuous annular stator core 1 back to the lower arc-shaped core portion 8 of the second discontinuous annular stator core 2. Similar to the upper magnetic-flux conductor 31, the lower magnetic-flux conductor 32 is laterally positioned to the first discontinuous annular stator core 1 and the second discontinuous annular stator core 2 so that the lower magnetic-flux conductor 32 does not mechanically interfere with the rotation of the rotor core 19. Moreover, the lower magnetic-flux conductor 32 is connected in between the lower arc-shaped core portion 8 of the first discontinuous annular stator core 1 and the lower arc-shaped core portion 8 of the second discontinuous annular stator core 2, which provides the physical conductive path for the traversing magnetic flux 30 to travel from the lower arc-shaped core portion 8 of the first discontinuous annular stator core 1 back to the lower arc-shaped core portion 8 of the second discontinuous annular stator core 2.

In order to either generate a magnetic flux through the upper arc-shaped core portion 3 or induct an electrical current with the upper arc-shaped core portion 3, the first discontinuous annular stator core 1 and the second discontinuous annular stator may each further comprise an upper wiring 13, which is shown in FIGS. 6, 8, 10, and 12. In addition, the upper arc-shaped core portion 3 may further comprise an upper concave section 6 and a plurality of upper wire-receiving teeth 7, which are used to guide and hold the upper wiring 13 in place on the upper arc-shaped core portion 3. The upper concave section 6 is positioned concentric about the rotor core 19, and the plurality of upper wire-receiving teeth 7 is integrated around the upper concave section 6. Moreover, the upper wiring 13 comprises a plurality of upper flux-generating turns 14, which are the functional segments of the upper wiring 13, and a plurality of upper end turns 15, which are the non-functional segments of the upper wiring 13. Each of the plurality of upper flux-generating turns 14 is wound through a corresponding tooth from the plurality of upper wire-receiving teeth 7 so that an electrical current travelling through each of the plurality of upper flux-generating turns 14 in same direction is able to generate a magnetic flux that is properly oriented through the upper arc-shaped core portion 3. Alternatively, a magnetic flux travelling through the upper arc-shaped core portion 3 is able to generate an electrical current travelling through each of the plurality of upper flux-generating turns 14 in the same direction. The plurality of upper end turns 15 is positioned adjacent to the upper magnetically-north arc end 4 and the upper magnetically-south arc end 5, which prevents the plurality of upper end turns 15 from electromagnetically interfering with the upper arc-shaped core portion 3 or the plurality of upper flux-generating turns 14.

Likewise, in order to either generate a magnetic flux through the lower arc-shaped core portion 8 or induct an electrical current with the lower arc-shaped core portion 8, the first discontinuous annular stator core 1 and the second discontinuous annular stator may each further comprise a lower wiring 16, which is shown in FIGS. 6, 8, 10, and 12. In addition, the lower arc-shaped core portion 8 may further comprise a lower concave section 11 and a plurality of lower wire-receiving teeth 12, which are used to guide and hold the lower wiring 16 in place on the lower arc-shaped core portion 8. The lower concave section 11 is positioned concentric about the rotor core 19, and the plurality of lower wire-receiving teeth 12 is integrated around the lower concave section 11. Moreover, the lower wiring 16 comprises a plurality of lower flux-generating turns 17, which are the functional segments of the lower wiring 16, and a plurality of lower end turns 18, which are the non-functional segments of the lower wiring 16. Each of the plurality of lower flux-generating turns 17 is wound through a corresponding tooth from the plurality of lower wire-receiving teeth 12 so that an electrical current travelling through each of the plurality of lower flux-generating turns 17 in same direction is able to generate a magnetic flux that is properly oriented through the lower arc-shaped core portion 8. Alternatively, a magnetic flux travelling through the lower arc-shaped core portion 8 is able to generate an electrical current travelling through each of the plurality of lower flux-generating turns 17 in the same direction. The plurality of lower end turns 18 is positioned adjacent to the lower magnetically-north arc end 9 and the lower magnetically-south arc end 10, which prevents the plurality of lower end turns 18 from electromagnetically interfering with the lower arc-shaped core portion 8 or the plurality of lower flux-generating turns 17. Finally, the electrical current traveling through the lower wiring 16 is in an opposite direction as the electrical current traveling through upper wiring 13, which generates circumferentially-partitioned magnetic fluxes in the stator cores rotating in opposite directions and consequently drives the rotation of the rotor core 19.

In order for the present invention to generate a magnetic flux through and along the rotor core 19, the present invention may comprise an annular excitation coil 33, which is shown in FIGS. 1 through 12. Thus, the annular excitation coil 33 is used to generate the traversing magnetic flux 30 by having an electrical current travel around the annular excitation coil 33 in the same annular direction as the rotation of the rotor core 19. The annular excitation coil 33 is laterally mounted around the rotor core 19 so that the annular excitation coil 33 does not mechanically interfere with the rotation of the rotor core 19. The annular excitation coil 33 is positioned in between the first discontinuous annular stator core 1 and the second discontinuous annular stator core 2, which allows the annular excitation coil 33 to evenly distribute the traversing magnetic flux 30 between the first discontinuous annular stator core 1 and the second discontinuous annular stator core 2. The annular excitation coil 33 is also positioned offset from the first discontinuous annular stator core 1, which electrically isolates the upper wiring 13 and the lower wiring 16 of the first discontinuous annular stator core 1 from the annular excitation coil 33. Similarly, the annular excitation coil 33 is positioned offset from the second discontinuous annular stator core 2, which electrically isolates the upper wiring 13 and the lower wiring 16 of the second discontinuous annular stator core 2 from the annular excitation coil 33. In addition, when a DC motor is running, there is a back-emf generated by the DC motor, and, thus, the supply of DC voltage needs to be higher than this back emf in order to keep producing a motor drive torque. If the traversing magnetic flux 30 is increased to produce a back emf higher than the supply of voltage, the electric current would then travel in the opposite direction to charge the battery. This can happen with the present invention when the vehicle is going downhill or facing a stop light/sign, and the traversing magnetic flux 30 is raised.

The rotor core 19 needs to readily conduct and manage the different magnetic fluxes that traverse through it. Thus, a first embodiment of the rotor core 19 comprises a conductive cylindrical body 20 and a plurality of insulative barriers 23, which are shown in FIGS. 1 through 12. The conductive cylindrical body 20 is shaped to allow the rotor core 19 to freely rotate within the first discontinuous annular stator core 1 and the second discontinuous annular stator core 2 and is made of a material that is able conduct the traversing magnetic flux 30 through the rotor core 19. The conductive cylindrical body 20 is preferably made of iron. The conductive cylindrical body 20 can also be constructed with a larger radius in order to better maintain the structural integrity of the present invention and to better converse annular momentum while the rotor core 19 is rotating. The conductive cylindrical body 20 is radially partitioned by the plurality of insulative barriers 23, which prevents the short circuiting of the different magnetic fluxes that traverse through the conductive cylindrical body 20. The radial partitioning of the conductive cylindrical body 20 by the plurality of insulative barriers 23 also allows the present invention to function without brushes as a motor/generator using natural magnetic-flux commutation.

Figure 13:
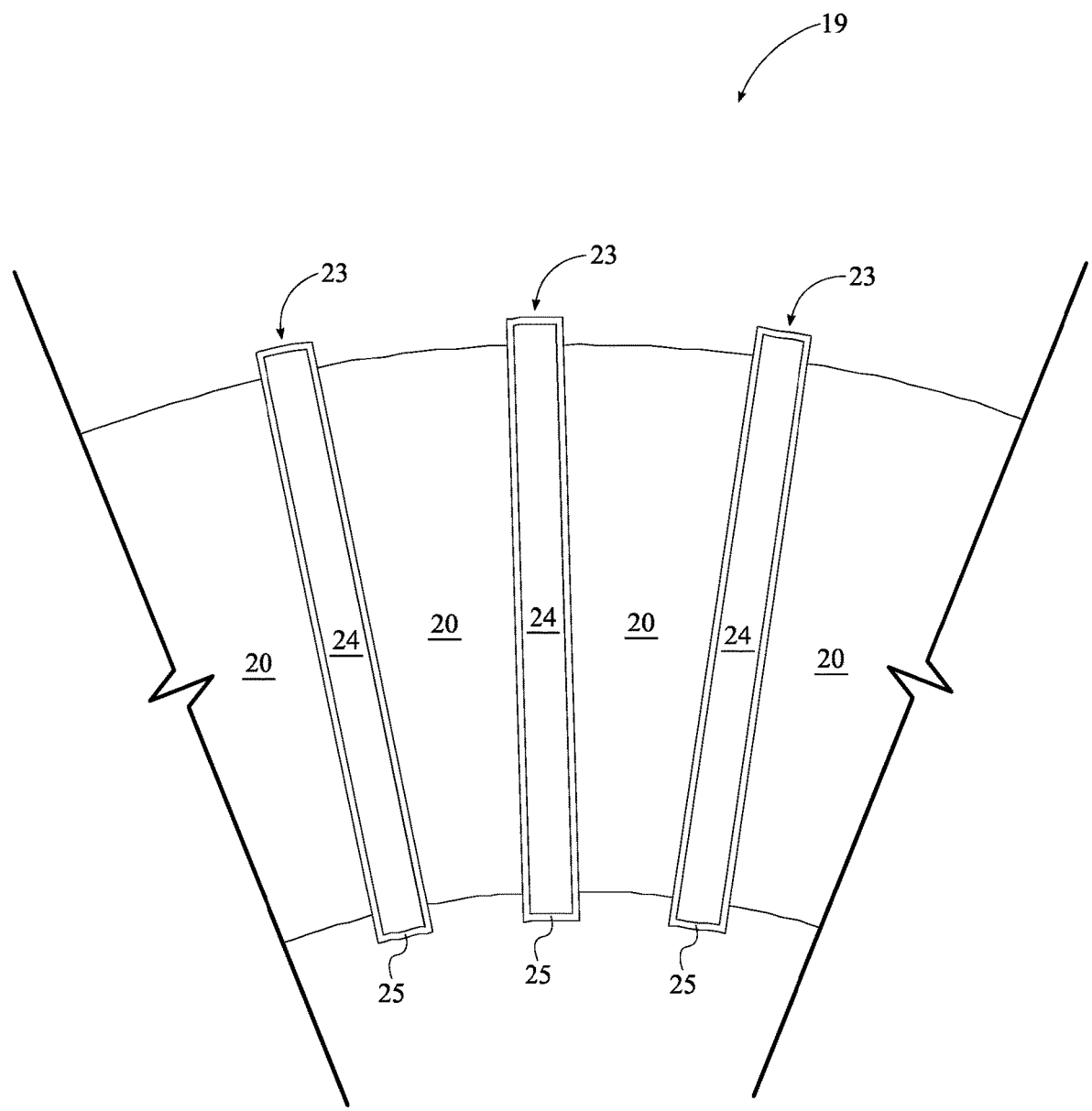
FIG. 13 is a cut schematic view showing a first embodiment of the rotor core for the present invention.
Figure 14:
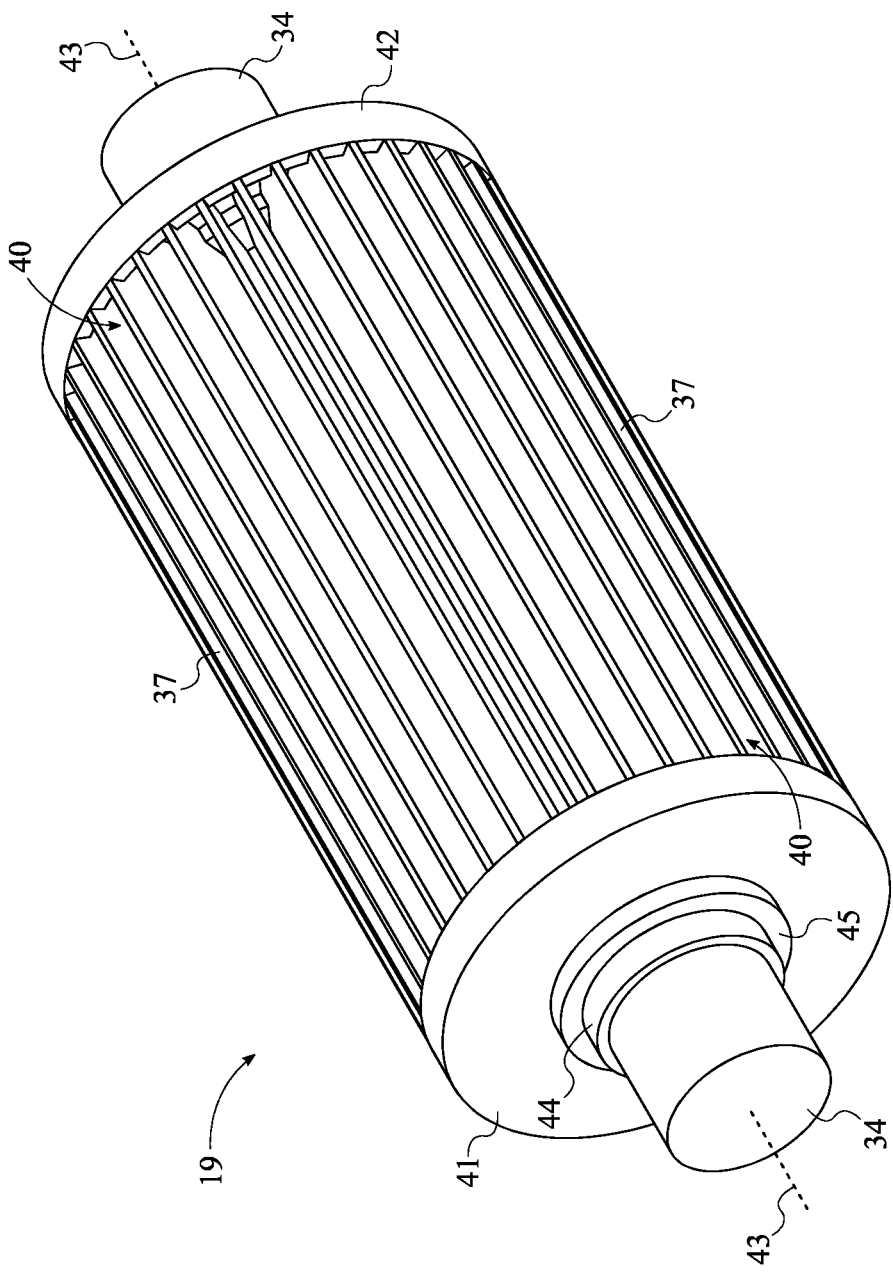
FIG. 14 is a front-left-top perspective view showing a second embodiment of the rotor core with the input/output shaft.
Figure 15:
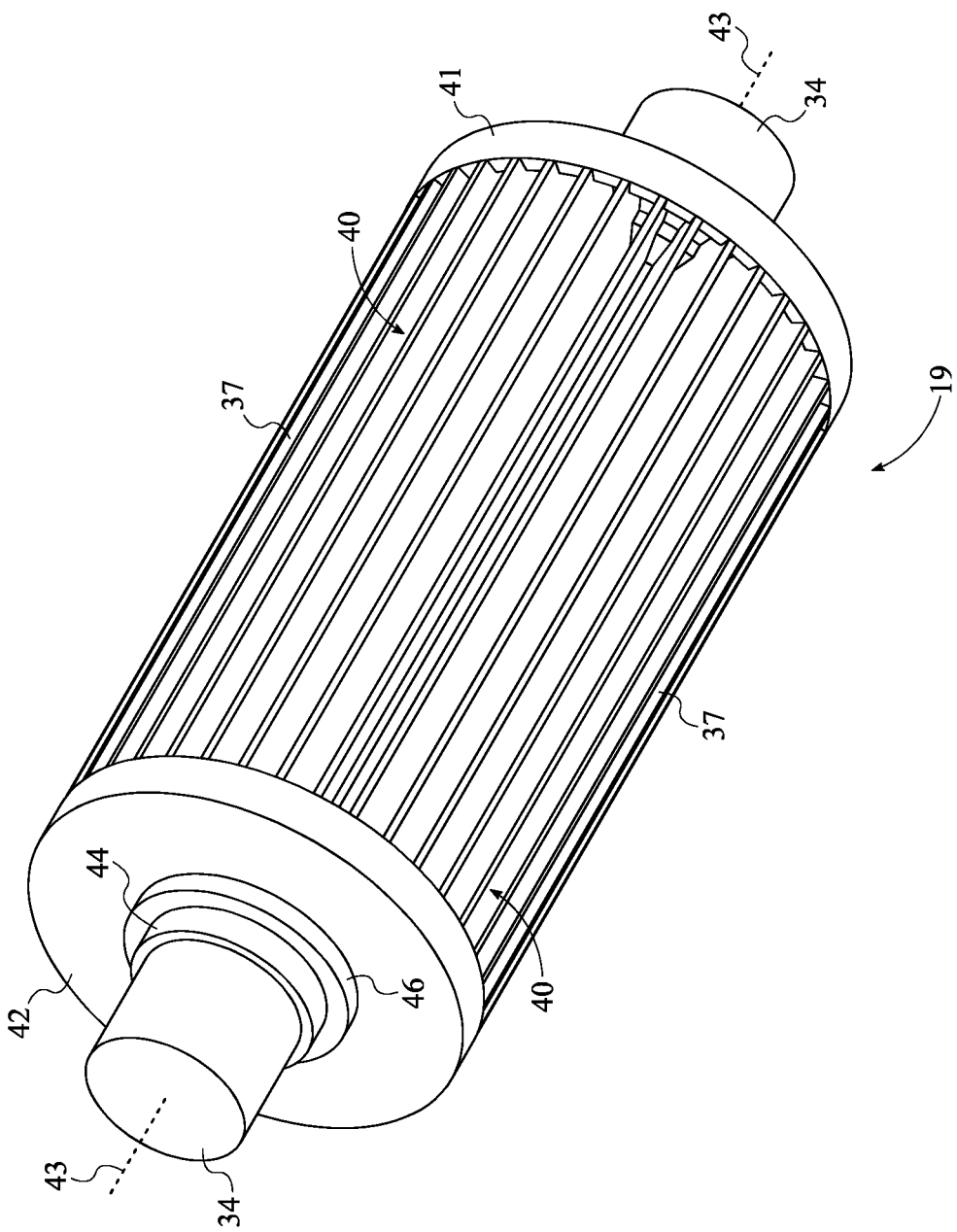
FIG. 15 is a rear-right-bottom perspective view showing the second embodiment of the rotor core with the input/output shaft.
Figure 16:
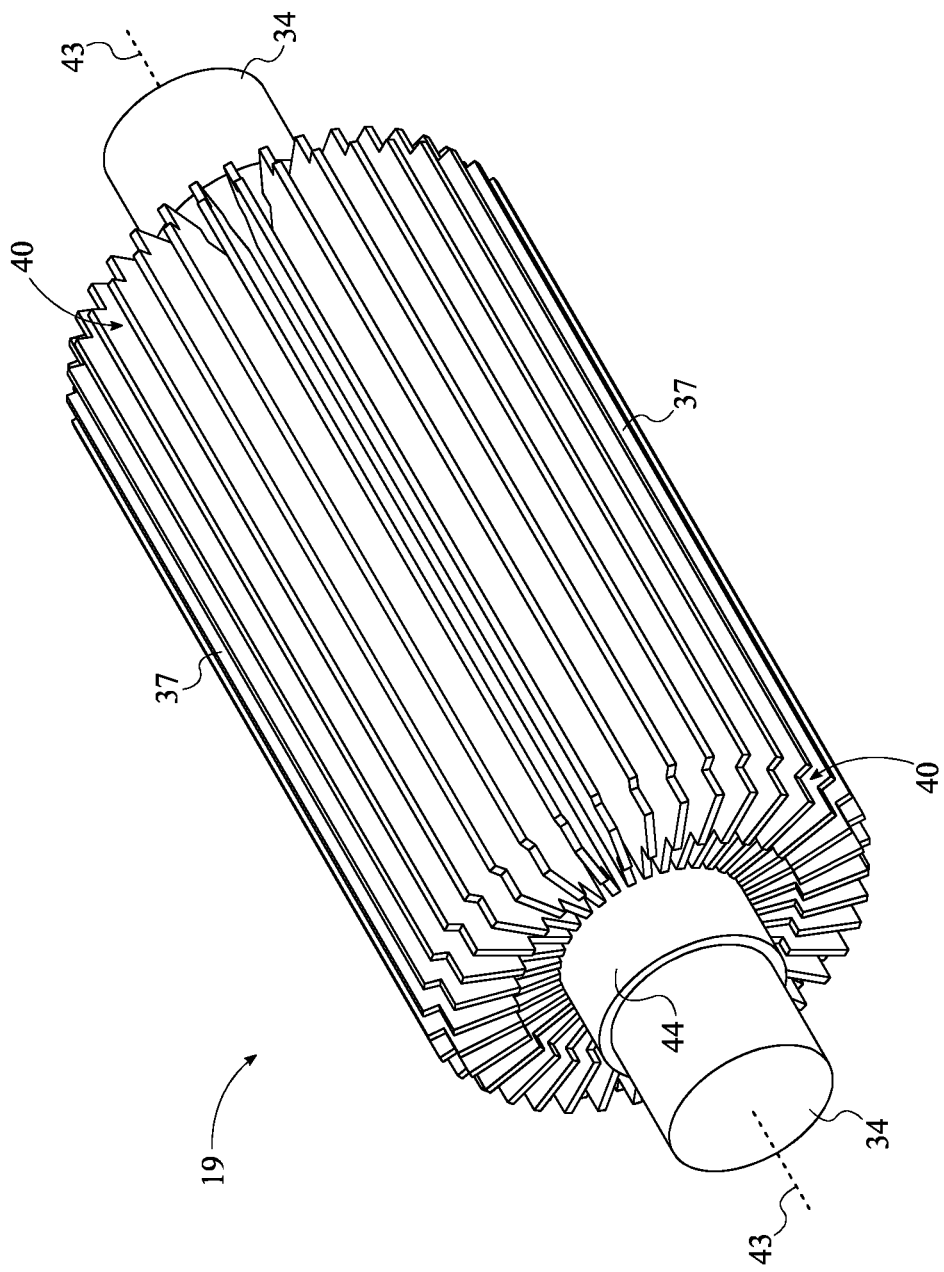
FIG. 16 is a front-left-top perspective view showing the second embodiment of the rotor core with the input/output shaft and without the end plates.
Figure 17:
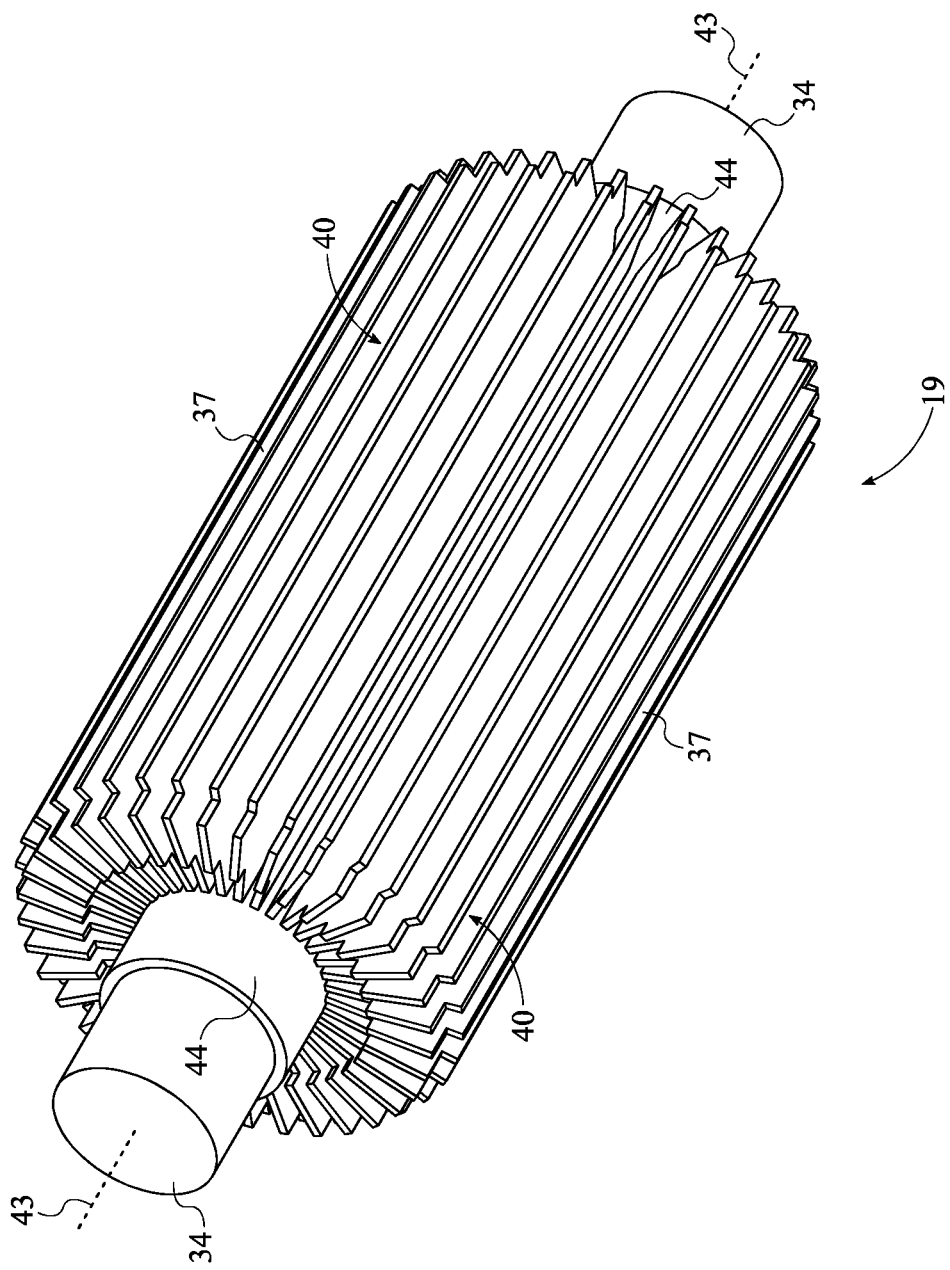
FIG. 17 is a rear-right-bottom perspective view showing the second embodiment of the rotor core with the input/output shaft and without the end plates.
Figure 18:
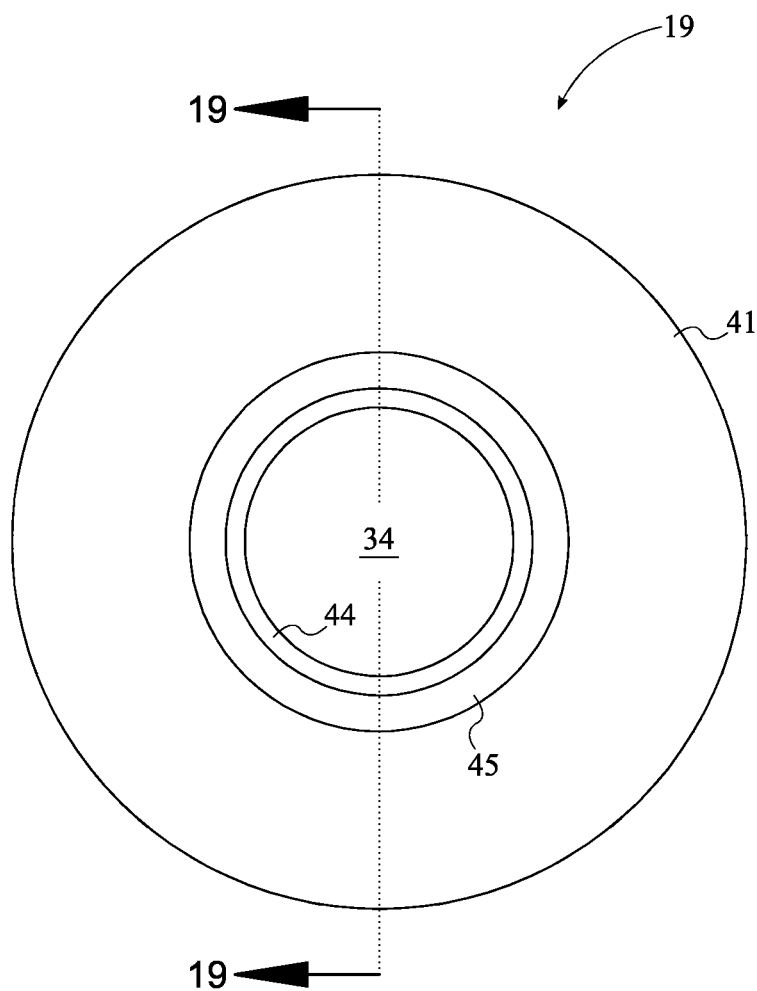
FIG. 18 is a front view showing the second embodiment of the rotor core with the input/output shaft.
Figure 19:
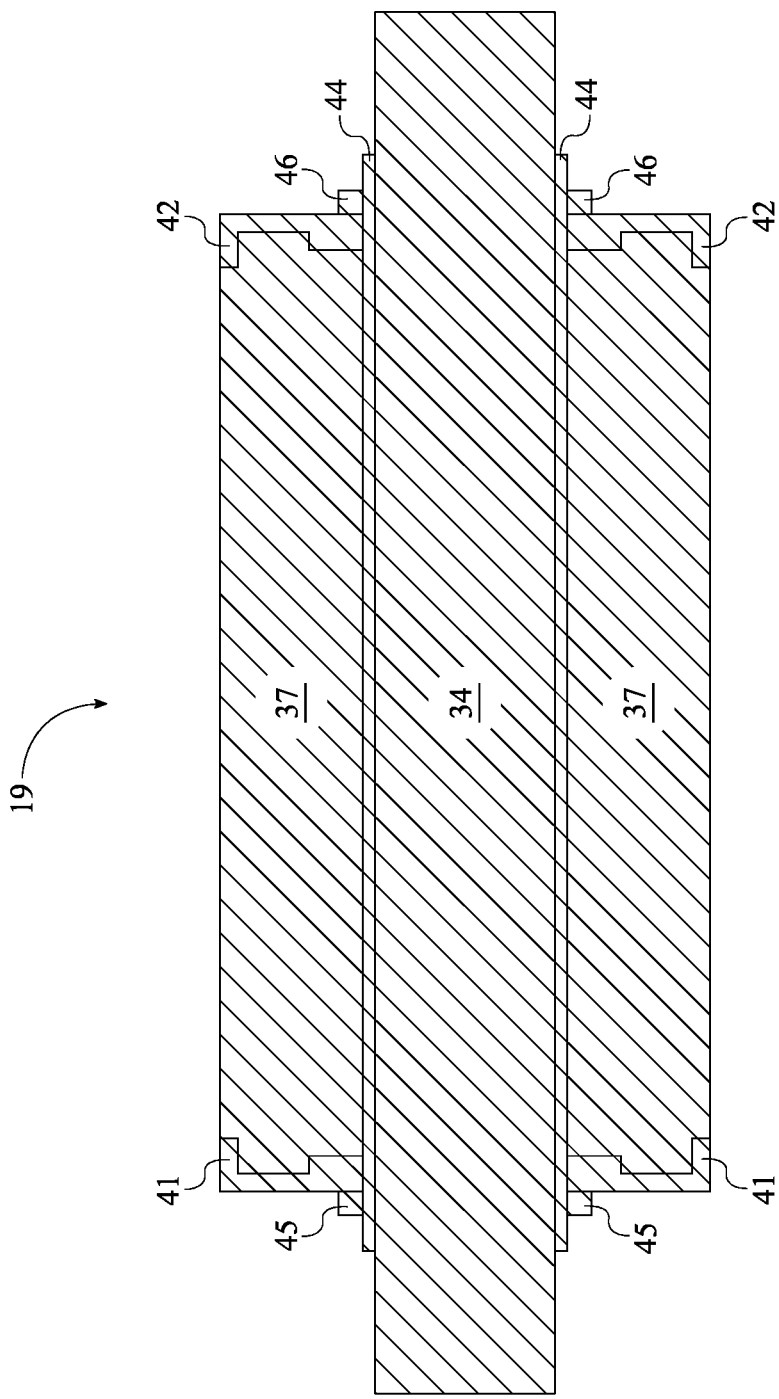
FIG. 19 is a cross-sectional view taken along line 19-19 in FIG. 18.

As can be seen in FIGS. 3 and 4, in order to better prevent this kind of short circuiting, the conductive cylindrical body 20 may comprise a first body base 21 and a second body base 22, which are the two opposing bases of the conductive cylindrical body 20. The first body base 21 is positioned adjacent to the first discontinuous annular stator core 1, while the second body base 22 is positioned adjacent to the second discontinuous annular stator core 2, which confines the rotor core 19 within the first discontinuous annular stator core 1 and the second discontinuous annular stator core 2. Each of the plurality of insulative barriers 23 traverses into the first body base 21, through the conductive cylindrical body 20, and out of the second body base 22 so that each radial portion from the conductive cylindrical body 20 is electrically insulated along the entire length of the conductive cylindrical body 20. In addition, each of the plurality of insulative barriers 23 may comprise a barrier body 24 and an insulative barrier coating 25, which are shown in FIG. 13. The barrier body 24 is the elongated structural body of each insulative barrier 23, and the insulative barrier coating 25 is externally applied onto the barrier body 24, which allows each insulative barrier 23 to improve its electrical insulation for the radial portions of the conductive cylindrical body 20 amongst each other.

The present invention can also be configured to better manage the electrical interference generate by eddy currents in the rotor core 19. Thus, a second embodiment of the rotor core 19 comprises a plurality of conductive laminations 37, a plurality of annular gaps 40, a first annular insulative plate 41, and a second annular insulative plate 42, which is shown in FIGS. 14 through 19. Each of the plurality of conductive laminations 37 is a thin strip of conductive material that allows the traversing magnetic flux 30 to travel through the rotor core 19. The plurality of conductive laminations 37 is preferably made of silicone-steel. The plurality of annular gaps 40 is used to electrically insulate the plurality of conductive laminations 37 amongst each other. However, in some embodiments, the plurality of annular gaps 40 may be filled by glue or another kind of adhesive in order to further improve the structural integrity of the rotor core 19 while simultaneously improving the electrical insulation amongst the plurality of conductive laminations 37. The first annular insulative plate 41 and the second annular insulative plate 42 are used to hold the plurality of conductive laminations 37 in place and are not able to receive the traversing magnetic flux 30 from the plurality of conductive laminations 37. Moreover, the plurality of conductive laminations 37 is radially positioned around a central rotation axis 43 of the rotor core 19, which allows the rotor core 19 to complete and conduct the traversing magnetic flux 30 as the rotor core 19 rotates within the stator cores. The plurality of annular gaps 40 is interspersed amongst the plurality of conductive laminations 37 so that the plurality of annular gaps 40 is able to act as insulative barriers in preventing the short circuiting of the different magnetic fluxes between the plurality of conductive laminations 37. The first annular insulative plate 41 is concentrically positioned to the central rotation axis 43, adjacent to the first discontinuous annular stator core 1, while the second annular insulative plate 42 is concentrically positioned to the central rotation axis 43, adjacent to the second discontinuous annular stator core 2, which allows each of the plurality of conductive laminations 37 to be connected in between the first annular insulative plate 1 and the second annular insulative plate 2. This arrangement between the first annular insulative plate 41, the second annular insulative plate 42, and the plurality of conductive laminations 37 maintains the structural integrity of the rotor core 19. Furthermore, a first lamination end for each conductive lamination 37 and the first annular insulative plate 41 are preferably interfaced with each other by at least one keyway and at least one groove. Likewise, a second lamination end for each conductive lamination 37 and the second annular insulative plate 42 are preferably interfaced with each other by at least one keyway and at least one groove.

Some embodiments of the present invention may further comprise a plurality of structural-reinforcement non-magnetic rings, which would be laterally connected around the plurality of conductive laminations 37 in order to further maintain the structural integrity of the rotor core 19. The structural-reinforcement non-magnetic rings would be evenly distributed along the rotor core 19 (e.g., at the ends of the rotor 19 and in the middle of the rotor core 19). In addition, although an outer diameter of the structural-reinforcement non-magnetic rings is larger than a bore diameter of the separated stator cores, it does not preclude the removal of the rotor core 19 from the separated stator cores because the separated stator cores can be removed in a radial direction. Consequently, the rotor core 19 can be removed in a radial direction.

As can be seen FIGS. 14 through 19, in order to prevent the input/output shaft 34 from receiving the traversing magnetic flux 30 through the second embodiment of the rotor core 19, the present invention may further comprise an insulative shaft sleeve 44, which is used to transfer rotational motion from the rotor core 19 to the input/output shaft 34 and vice versa. Consequently, the first annular insulative plate 41 and the second annular insulative plate 42 are laterally attached to the insulative shaft sleeve 44, and the input/output shaft 34 is torsionally connected through the insulative shaft sleeve 44, which allows rotational motion to transfer from the plurality of conductive laminations 37, through the first annular insulative plate 41 and the second annular insulative plate 42, through the insulative shaft sleeve 44, and to the input/output shaft 34 and vice versa. The insulative shaft sleeve 44 and the input/output shaft 34 are preferably interfaced with each other by at least one keyway and at least one groove. In addition, each of the plurality of conductive laminations 37 is positioned parallel to the insulative shaft sleeve 44, and the plurality of conductive laminations 37 is radially positioned around the insulative shaft sleeve 44. This arrangement between the plurality of conductive laminations 37 and the insulative shaft sleeve 44 prevents any mechanical interference between the plurality of conductive laminations 37 and the insulative shaft sleeve 44 as the rotor core 19 rotates within the stator cores. This arrangement between the plurality of conductive laminations 37 and the insulative shaft sleeve 44 also prevents the input/output shaft 34 from receiving the traversing magnetic flux 30 because the insulative shaft sleeve 44 is able to electrically insulate the input/output shaft 34.

In order to secure the insulative shaft sleeve 44 in place with the first annular insulative plate 41 and the second annular insulative plate 42, the present invention may further comprise a first fastener 45 and a second fastener 46, which are shown in FIGS. 14, 15, 18, and 19. Thus, the first annular insulative plate 41 is laterally attached to insulative shaft sleeve 44 by the first fastener 45, while the second annular insulative plate 42 is laterally attached to insulative shaft sleeve 44 by the second fastener 46, which further maintains the structural integrity of the rotor core 19.

Figure 20:
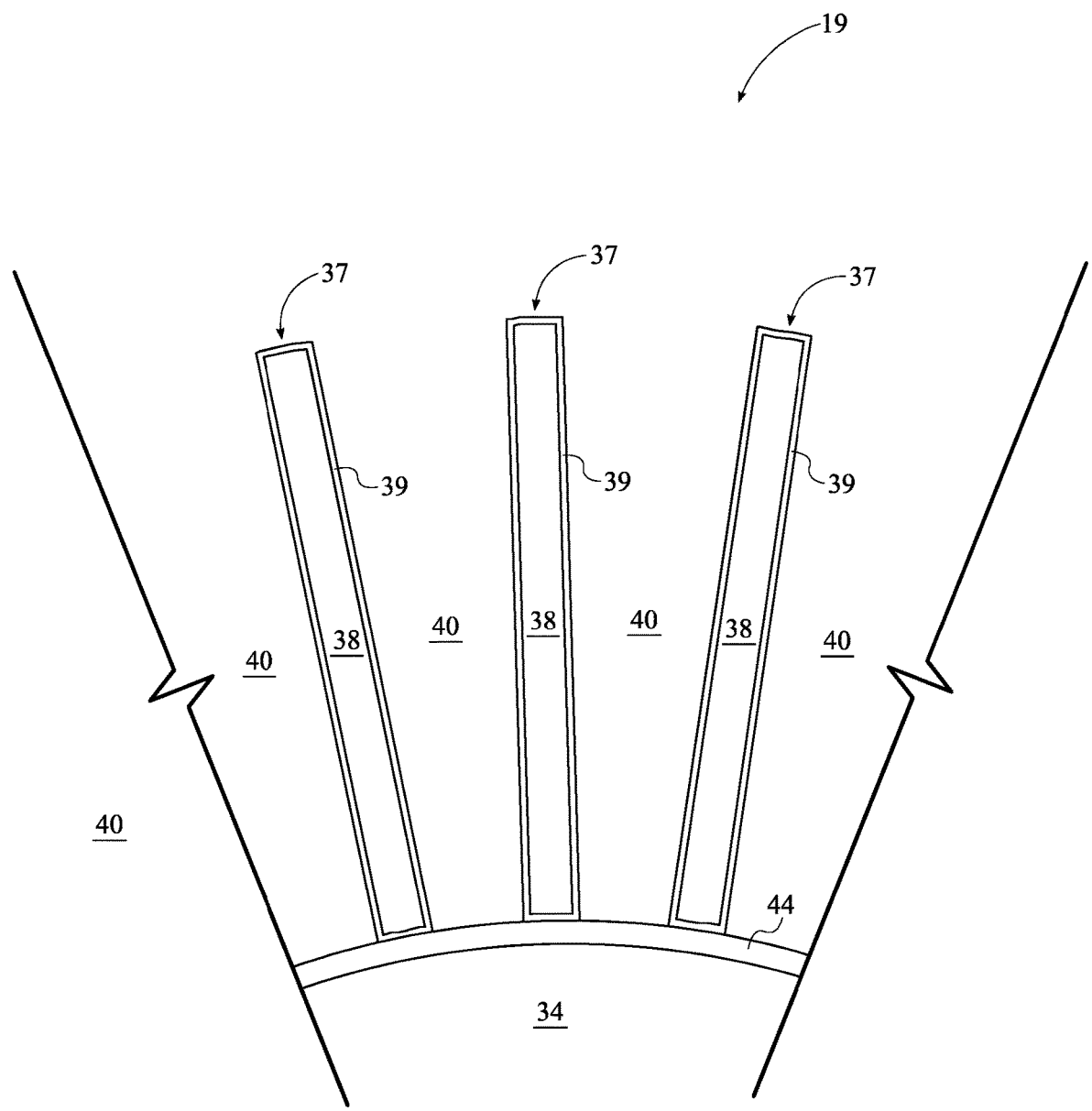
FIG. 20 is a cut schematic view showing the second embodiment of the rotor core with the input/output shaft.

In order to further prevent the short circuiting of the different magnetic fluxes between the plurality of conductive laminations 37, each of the plurality of conductive laminations 37 may comprise a lamination body 38 and an insulative lamination coating 39, which is shown in FIG. 20. The lamination body 38 is the elongated structural body of each conductive lamination 37, and the insulative lamination coating 39 is externally applied onto the lamination body 38. The insulative lamination coating 39 is used in conjunction with the plurality of annular gaps 40 in order to maximize the electrical insulation amongst the plurality of conductive laminations 37. The insulative lamination coating 39 is preferably varnish.

An optimal configuration for the plurality of conductive laminations 37 depends on a variety of aspects. One aspect is that the plurality of conductive laminations 37 needs to provide sufficient cross-sectional area to conduct the traversing magnetic field 30, which can be accomplished by adjusting the number of conductive laminations and/or by adjusting the physical dimensions of the lamination body 38. Another aspect is that the plurality of conductive laminations 37 needs to be balanced between more steel for better flux conduction and less circular flux blocking, and less steel for lower flux conduction and higher circular flux blocking. Another aspect is that an axial length for each of the plurality of conductive laminations 37 is sized to be longer than a distance between a first discontinuous annular stator core 1 and a second discontinuous annular stator core 2. Another aspect is that a thickness of the lamination body 38 can either be shaped to be uniform in a radial direction away from the central rotation axis 43 or be shaped with a taper in a radial direction towards the central rotation axis 43. Another aspect is that the plurality of conductive laminations 37 is arranged into groupable stacks about the central rotation axis 43.

As can be seen in FIGS. 1 through 12, the present invention is typically used as either an electrical motor or an electrical generator. Thus, the present invention may further comprise an input/output shaft 34, which is used to transfer rotation motion to an external object (e.g., an accelerating wheel, a fan blade, etc.) or is used to receive rotation motion from an external object (e.g., a decelerating wheel, propellers of a windmill, etc.). The input/output shaft 34 needs to be torsionally connected to the rotor core 19 so that, if the rotor core 19 is rotated by the magnetic fluxes generated by the present invention, then the rotor core 19 can transfer its rotational motion to the input/output shaft 34. Alternatively, if the rotor core 19 is rotated by the input/output shaft 34 by an external rotational force, then the present invention can use to the electromagnetic configuration of its components to generate electrical energy. Moreover, the rotor core 19 and the input/output shaft 34 need to be electrically insulated from each other in order to prevent the short circuiting of magnetic fluxes. Thus, the present invention may further comprise a first insulative holder 35 and a second insulative holder 36, which are used to physically connect the rotor core 19 to the input/output shaft 34 but are not used to electrically connect the rotor core 19 to the input/output shaft 34. The rotor core 19 is a tubular body, and the input/output shaft 34 is positioned through the rotor core 19 so that the rotor core 19 and the input/output shaft 34 are axially aligned with each other. The first insulative holder 35 is laterally connected to the input/output shaft 34 and is terminally connected to the rotor core 19 so that a physical electrically-insulative connection is made at one end of the present invention between the rotor core 19 and the input/output shaft 34. Likewise, the second insulated holder is laterally connected to the input/output shaft 34 and is terminally connected to the rotor core 19 so that another physical electrically-insulative connection is made at the other end of the present invention between the rotor core 19 and the input/output shaft 34.

Although the invention has been explained in relation to its preferred embodiment, it is to be understood that many other possible modifications and variations can be made without departing from the spirit and scope of the invention as hereinafter claimed.

What is claimed is:

1. A homopolar multi-core energy conversion device comprising:
   a first discontinuous annular stator core;
   a second discontinuous annular stator core;
   a rotor core;
   the first discontinuous annular stator core and the second discontinuous annular stator core each comprising an upper arc-shaped core portion and a lower arc-shaped core portion;
   the upper arc-shaped core portion comprising an upper magnetically-north arc end and an upper magnetically-south arc end;
   the lower arc-shaped core portion comprising a lower magnetically-north arc end and a lower magnetically-south arc end;
   the rotor core being rotatably mounted within the first discontinuous annular stator core and the second discontinuous annular stator core;
   the first discontinuous annular stator core and the second discontinuous annular stator core being positioned opposite to each other along the rotor core;
   the first discontinuous annular stator core being positioned offset from the rotor core by a first annular gap;
   the second discontinuous annular stator core being positioned offset from the rotor core by a second annular gap;
   the first discontinuous annular stator core being configured to generate a circumferentially-segmented clockwise magnetic flux around the rotor core;
   the second discontinuous annular stator core being configured to generate a circumferentially-segmented counter-clockwise magnetic flux around the rotor core;
   the rotor core being configured to radially partition a traversing magnetic flux;
   the upper arc-shaped core portion and the lower arc-shaped core portion being positioned offset from each other about the rotor core;
   the upper magnetically-north arc end and the lower magnetically-south arc end being positioned adjacent to each other; and
   the upper magnetically-south arc end and the lower magnetically-north arc end being positioned adjacent to each other.

2. The homopolar multi-core energy conversion device as claimed in claim 1 comprising:
   the upper magnetically-north arc end of the first discontinuous annular stator core and the upper magnetically-south arc end of the second discontinuous annular stator core being positioned coincident with each other along the rotor core; and
   the upper magnetically-south arc end of the first discontinuous annular stator core and the upper magnetically-north arc end of the second discontinuous annular stator core being positioned coincident with each other along the rotor core.

3. The homopolar multi-core energy conversion device as claimed in claim 1 comprising:
   the lower magnetically-south arc end of the first discontinuous annular stator core and the lower magnetically-north arc end of the second discontinuous annular stator core being positioned coincident with each other along the rotor core; and
   the lower magnetically-north arc end of the first discontinuous annular stator core and the lower magnetically-south arc end of the second discontinuous annular stator core being positioned coincident with each other along the rotor core.

4. The homopolar multi-core energy conversion device as claimed in claim 1 comprising:
   an upper magnetic-flux conductor;
   the upper magnetic-flux conductor being laterally positioned to the first discontinuous annular stator core and the second discontinuous annular stator core; and
   the upper magnetic-flux conductor being connected in between the upper arc-shaped core portion of the first discontinuous annular stator core and the upper arc-shaped core portion of the second discontinuous annular stator core.

5. The homopolar multi-core energy conversion device as claimed in claim 1 comprising:
   a lower magnetic-flux conductor;

the lower magnetic-flux conductor being laterally positioned to the first discontinuous annular stator core and the second discontinuous annular stator core; and the lower magnetic-flux conductor being connected in between the lower arc-shaped core portion of the first discontinuous annular stator core and the lower arc-shaped core portion of the second discontinuous annular stator core.

6. The homopolar multi-core energy conversion device as claimed in claim 1 comprising:

the first discontinuous annular stator core and the second discontinuous annular stator core each further comprising an upper wiring;

the upper arc-shaped core portion further comprising an upper concave section and a plurality of upper wire-receiving teeth;

the upper wiring comprising a plurality of upper flux-generating turns and a plurality of upper end turns;

the plurality of upper wire-receiving teeth being integrated about the upper concave section;

each of the plurality of upper flux-generating turns being wound through a corresponding tooth from the plurality of upper wire-receiving teeth; and the plurality of upper end turns being positioned adjacent to the upper magnetically-north arc end and the upper magnetically-south arc end.

7. The homopolar multi-core energy conversion device as claimed in claim 1 comprising:

the first discontinuous annular stator core and the second discontinuous annular stator core each further comprising a lower wiring;

the lower arc-shaped core portion further comprising a lower concave section and a plurality of lower wire-receiving teeth;

the lower wiring comprising a plurality of lower flux-generating turns and a plurality of lower end turns;

the plurality of lower wire-receiving teeth being integrated about the lower concave section;

each of the plurality of lower flux-generating turns being wound through a corresponding tooth from the plurality of lower wire-receiving teeth; and the plurality of lower end turns being positioned adjacent to the lower magnetically-north arc end and the lower magnetically-south arc end.

8. The homopolar multi-core energy conversion device as claimed in claim 1 comprising:

an annular excitation coil;

the annular excitation coil being laterally mounted around the rotor core;

the annular excitation coil being positioned in between the first discontinuous annular stator core and the second discontinuous annular stator core;

the annular excitation coil being positioned offset from the first discontinuous annular stator core; and the annular excitation coil being positioned offset from the second discontinuous annular stator core.

9. The homopolar multi-core energy conversion device as claimed in claim 1 comprising:

the rotor core comprising a conductive cylindrical body and a plurality of insulative barriers; and the conductive cylindrical body being radially partitioned by the plurality of insulative barriers.

10. The homopolar multi-core energy conversion device as claimed in claim 9 comprising:

the conductive cylindrical body comprising a first body base and a second body base;

the first body base being positioned adjacent to the first discontinuous annular stator core;

the second body base being positioned adjacent to the second discontinuous annular stator core; and each of the plurality of insulative barriers traversing into the first body base, through the conductive cylindrical body, and out of the second body base.

11. The homopolar multi-core energy conversion device as claimed in claim 9 comprising:

each of the plurality of insulative barriers comprising a barrier body and an insulative barrier coating; and the insulative barrier coating being externally applied onto the barrier body.

12. The homopolar multi-core energy conversion device as claimed in claim 1 comprising:

an input/output shaft; and the input/output shaft being torsionally connected to the rotor core.

13. The homopolar multi-core energy conversion device as claimed in claim 12 comprising:

a first insulative holder;

a second insulative holder;

the rotor core being a tubular body;

the input/output shaft being positioned through the rotor core;

the first insulative holder being laterally connected to the input/output shaft;

the first insulative holder being terminally connected to the rotor core;

the second insulative holder being laterally connected to the input/output shaft; and the second insulative holder being terminally connected to the rotor core, opposite the first insulative holder.

14. The homopolar multi-core energy conversion device as claimed in claim 1 comprising:

the rotor core comprising a plurality of conductive laminations, a plurality of annular gaps, a first annular insulative plate, and a second annular insulative plate;

the plurality of conductive laminations being radially positioned around a central rotation axis of the rotor core;

the plurality of annular gaps being interspersed amongst the plurality of conductive laminations;

the first annular insulative plate being concentrically positioned to the central rotation axis, adjacent to the first discontinuous annular stator core;

the second annular insulative plate being concentrically positioned to the central rotation axis, adjacent to the second discontinuous annular stator core; and each of the plurality of conductive laminations being connected in between the first annular insulative plate and the second annular insulative plate.

15. The homopolar multi-core energy conversion device as claimed in claim 14 comprising:

an input/output shaft;

an insulative shaft sleeve;

each of the plurality of conductive laminations being positioned parallel to the insulative shaft sleeve;

the plurality of conductive laminations being radially positioned around the insulative shaft sleeve;

the first annular insulative plate and the second annular insulative plate being laterally attached to the insulative shaft sleeve; and the input/output shaft being torsionally connected through the insulative shaft sleeve.

16. The homopolar multi-core energy conversion device as claimed in claim 15 comprising:

a first fastener;

a second fastener;

the first annular insulative plate being laterally attached to insulative shaft sleeve by the first fastener; and the second annular insulative plate being laterally attached to insulative shaft sleeve by the second fastener.

17. The homopolar multi-core energy conversion device as claimed in claim 14 comprising:

each of the plurality of conductive laminations comprising a lamination body and an insulative lamination coating; and the insulative lamination coating being externally applied onto the lamination body.

* * * * *